United States Patent
Ochiai et al.

(10) Patent No.: US 10,801,382 B2
(45) Date of Patent: Oct. 13, 2020

(54) EXHAUST GAS-PURIFYING CATALYST

(71) Applicant: CATALER CORPORATION, Kakegawa-shi, Shizuoka (JP)

(72) Inventors: Daisuke Ochiai, Kakegawa (JP); Yoshinori Yamashita, Kakegawa (JP); Masatoshi Ikebe, Kakegawa (JP)

(73) Assignee: Cataler Corporation, Kakegawa-shi (JP)

( * ) Notice: Subject to any disclaimer, the term of this patent is extended or adjusted under 35 U.S.C. 154(b) by 0 days.

(21) Appl. No.: 16/662,902

(22) Filed: Oct. 24, 2019

(65) Prior Publication Data

US 2020/0056524 A1 Feb. 20, 2020

Related U.S. Application Data

(63) Continuation of application No. PCT/JP2017/045369, filed on Dec. 18, 2017.

(30) Foreign Application Priority Data

Apr. 28, 2017 (JP) ................................. 2017-089403

(51) Int. Cl.
*B01J 23/56* (2006.01)
*F01N 3/10* (2006.01)

(52) U.S. Cl.
CPC .............. *F01N 3/103* (2013.01); *B01J 23/56* (2013.01); *F01N 3/101* (2013.01); *F01N 2510/0684* (2013.01)

(58) Field of Classification Search
CPC ............ B01J 23/56; F01N 3/101; F01N 3/103
See application file for complete search history.

(56) References Cited

U.S. PATENT DOCUMENTS

| | | | |
|---|---|---|---|
| 6,777,370 B2 * | 8/2004 | Chen ................... | B01D 53/945 502/241 |
| 7,576,031 B2 * | 8/2009 | Beutel ..................... | B01J 23/44 502/326 |

(Continued)

FOREIGN PATENT DOCUMENTS

| JP | 2010-23430 A | 10/2010 |
|---|---|---|
| JP | 2015-151970 A | 8/2015 |

(Continued)

OTHER PUBLICATIONS

International Search Report dated Mar. 20, 2018 in connection with PCT International Application No. PCT/JP2017/045369.

(Continued)

*Primary Examiner* — Cam N. Nguyen
(74) *Attorney, Agent, or Firm* — John P. White; Gary J. Gershik; Cooper & Dunham LLP

(57) ABSTRACT

An exhaust gas-purifying catalyst of the present invention comprising a substrate, a first catalyst layer comprising a first supported catalyst, a second supported catalyst, palladium, and a first nitrogen oxide storage material, and a second catalyst layer comprising a third supported catalyst having an alloying rate of platinum and palladium of 40% or more and a second nitrogen oxide storage material, wherein a mass of the second supported catalyst is greater than a mass of the first supported catalyst and greater than a mass of the third supported catalyst.

10 Claims, 5 Drawing Sheets

(56) References Cited

U.S. PATENT DOCUMENTS

| | | | | |
|---|---|---|---|---|
| 7,875,573 B2* | 1/2011 | Beutel | B01J 23/44 | 423/213.2 |
| 8,066,963 B2* | 11/2011 | Klingmann | B01D 53/944 | 423/213.5 |
| 8,273,681 B2* | 9/2012 | Naito | B01D 53/945 | 502/302 |
| 8,475,752 B2* | 7/2013 | Wan | B01D 53/9422 | 423/213.2 |
| 8,491,860 B2* | 7/2013 | Lambert | F01N 13/009 | 423/213.2 |
| 8,551,908 B2* | 10/2013 | Satou | B01D 53/945 | 502/262 |
| 8,592,337 B2* | 11/2013 | Hilgendorff | B01D 53/9422 | 502/304 |
| 8,640,440 B2* | 2/2014 | Klingmann | B01D 53/944 | 60/274 |
| 8,641,993 B2* | 2/2014 | Dotzel | B01J 23/888 | 423/213.2 |
| 8,734,743 B2* | 5/2014 | Muller-Stach | B01D 53/945 | 423/213.5 |
| 8,784,759 B2* | 7/2014 | Hilgendorff | B01J 37/0036 | 422/170 |
| 8,787,759 B2* | 7/2014 | Shiba | H04J 12/0264 | 370/468 |
| 8,833,064 B2* | 9/2014 | Galligan | B01D 53/945 | 60/299 |
| 8,906,330 B2* | 12/2014 | Hilgendorff | B01J 23/464 | 423/213.5 |
| 8,950,174 B2* | 2/2015 | Hilgendorff | B01J 23/58 | 423/213.2 |
| 9,114,385 B2* | 8/2015 | Brisley | B01D 53/9422 | |
| 9,156,023 B2* | 10/2015 | Klingmann | B01D 53/945 | |
| 9,242,242 B2* | 1/2016 | Hilgendorff | B01J 23/58 | |
| 9,266,092 B2* | 2/2016 | Arnold | B01J 23/63 | |
| 9,433,927 B2* | 9/2016 | Ikeda | B01J 23/63 | |
| 9,517,448 B2* | 12/2016 | Kearl | B01D 53/9422 | |
| 9,540,980 B2* | 1/2017 | Hilgendorff | B01J 35/006 | |
| 9,550,176 B2* | 1/2017 | Sato | B01J 37/03 | |
| 9,604,175 B2* | 3/2017 | Hatfield | B01D 53/945 | |
| 9,610,564 B2* | 4/2017 | Xue | B01J 37/10 | |
| 9,616,386 B2* | 4/2017 | Hatanaka | B01J 21/066 | |
| 9,616,410 B2* | 4/2017 | Okada | B01D 53/945 | |
| 9,636,634 B2* | 5/2017 | Chiffey | B01D 53/72 | |
| 9,662,638 B2* | 5/2017 | Hoyer | B01J 37/0244 | |
| 9,675,970 B2* | 6/2017 | Matsueda | B01J 23/002 | |
| 9,828,896 B2* | 11/2017 | Swallow | F01N 3/2066 | |
| 9,833,771 B2* | 12/2017 | Goto | B01J 23/63 | |
| 9,861,961 B2* | 1/2018 | Umeno | B01D 53/9422 | |
| 9,890,676 B2* | 2/2018 | Kawabata | B01J 37/0244 | |
| 9,999,871 B2* | 6/2018 | Aoki | B01J 35/0006 | |
| 10,022,705 B2* | 7/2018 | Kimura | F01N 3/101 | |
| 10,118,156 B2* | 11/2018 | Horaguchi | B01D 53/9422 | |
| 10,137,414 B2* | 11/2018 | Hoke | B01D 53/945 | |
| 10,150,082 B2* | 12/2018 | Yoshikawa | B01D 53/945 | |
| 10,213,741 B2* | 2/2019 | Sato | B01J 23/42 | |
| 10,213,768 B2* | 2/2019 | Chandler | B01J 21/04 | |
| 10,428,708 B2* | 10/2019 | Utschig | B01J 23/002 | |
| 10,443,463 B2* | 10/2019 | Hoyer | B01J 29/763 | |
| 2004/0198595 A1* | 10/2004 | Chen | B01D 53/945 | 502/328 |
| 2005/0164879 A1* | 7/2005 | Chen | B01D 53/9422 | 502/328 |
| 2006/0217263 A1* | 9/2006 | Kawamoto | B01D 53/945 | 502/304 |
| 2008/0120970 A1* | 5/2008 | Hilgendorff | B01D 53/9422 | 60/299 |
| 2008/0207438 A1* | 8/2008 | Suzuki | B01D 53/945 | 502/302 |
| 2009/0257933 A1* | 10/2009 | Chen | B01D 53/945 | 423/213.2 |
| 2009/0298673 A1* | 12/2009 | Akamine | B01J 21/066 | 502/65 |
| 2012/0055142 A1* | 3/2012 | Hilgendorff | B01D 53/945 | 60/301 |
| 2013/0084222 A1* | 4/2013 | Grubert | B01J 29/04 | 422/170 |
| 2013/0189173 A1* | 7/2013 | Hilgendorff | B01D 53/945 | 423/213.5 |
| 2014/0205523 A1* | 7/2014 | Arnold | B01J 23/63 | 423/213.5 |
| 2015/0190793 A1* | 7/2015 | Swallow | B01J 37/0228 | 423/213.5 |
| 2015/0306571 A1 | 10/2015 | Jung | | |
| 2015/0336085 A1* | 11/2015 | Hoyer | B01J 37/0244 | 423/213.2 |
| 2018/0311646 A1* | 11/2018 | Chandler | B01J 23/464 | |
| 2018/0311648 A1* | 11/2018 | Chandler | B01D 53/9422 | |

FOREIGN PATENT DOCUMENTS

| | | |
|---|---|---|
| JP | 2016-093760 A | 5/2016 |
| JP | 2017-070899 A | 4/2017 |
| WO | WO 02/068118 A1 | 9/2002 |

OTHER PUBLICATIONS

Written Opinion (form PCT/ISA/237) dated Mar. 20, 2018 in connection with PCT International Application No. PCT/JP2017/045369.

English translation of the International Preliminary Report on Patentability dated Nov. 7, 2019 in connection with PCT International Application No. PCT/JP2017/045369.

\* cited by examiner

EXHAUST GAS-PURIFYING CATALYST

CROSS-REFERENCE TO RELATED APPLICATIONS

This application is a Continuation Application of PCT Application No. PCT/JP2017/045369, filed Dec. 18, 2017, and based upon and claiming the benefit of priority from Japanese Patent Application No. 2017-089403, filed Apr. 28, 2017, the entire contents of all of which are incorporated herein by reference.

FIELD

The present invention relates to an exhaust gas-purifying catalyst.

BACKGROUND

In many motor vehicles, a conventionally used internal combustion engine is a gasoline engine that supplies an air-fuel mixture having an air-fuel ratio close to the stoichiometric air-fuel ratio to a combustion chamber during normal driving. Exhaust gas emitted from the internal combustion engine contains harmful components such as carbon monoxide (CO), hydrocarbons (HC), and nitrogen oxides ($NO_x$). For this reason, a three-way catalyst is mounted on the motor vehicle as an exhaust gas-purifying catalyst for purifying these harmful components. The three-way catalyst promotes the oxidation of CO and HC in oxidizing atmospheres and promotes the reduction reaction of $NO_x$ in reducing atmospheres.

Meanwhile, a lean-burn engine has attracted attention as an internal combustion engine to be mounted on a motor vehicle from the viewpoint of diminishing fuel consumption in recent years. The lean-burn engine is an engine that supplies an air-fuel mixture having an air-fuel ratio larger than the stoichiometric air-fuel ratio to the combustion chamber during normal driving.

The exhaust gas emitted from the lean-burn engine has relatively low concentrations of CO and HC and relatively high concentrations of oxygen ($O_2$) and $NO_x$. Hence, it is difficult to sufficiently purify $NO_x$ contained in the exhaust gas emitted from the lean-burn engine using only three-way catalyst.

Accordingly, a $NO_x$ storage and reduction catalyst (NSR catalyst) has been proposed as an exhaust gas-purifying catalyst for a motor vehicle equipped with the lean-burn engine. As described in Jpn. Pat. Appln. KOKAI Publication No. 2010-234309 and Jpn. Pat. Appln. KOKAI Publication No. 2015-151970, the NSR catalyst contains a noble metal which promotes the reduction reaction of $NO_x$ and a $NO_x$ storage material capable of storing and releasing $NO_x$. As $NO_x$ storage materials, for example, an alkali metal element such as potassium (K), an alkaline earth metal element such as barium (Ba), a rare earth metal element such as cerium (Ce), or two or more of these are used.

The NSR catalyst stores $NO_x$ when the air-fuel mixture having the air-fuel ratio larger than the stoichiometric air-fuel ratio is supplied to the combustion chamber and the lean-burn engine emits oxidizing exhaust gas. The NSR catalyst then releases the stored $NO_x$ and promotes the reduction reaction of $NO_x$ when rich spike treatment to decrease the air-fuel ratio to a value less than the stoichiometric air-fuel ratio is performed and reducing exhaust gas is emitted.

SUMMARY

An object of the present invention is to provide a technology capable of achieving excellent $NO_x$ purification performance.

According to a first aspect of the present invention, there is provided an exhaust gas-purifying catalyst including: a substrate; a first catalyst layer supported by the substrate; and a second catalyst layer provided on the first catalyst layer, wherein the first catalyst layer contains a mixture of a first supported catalyst containing a first heat resistant carrier and rhodium supported by the first heat resistant carrier, a second supported catalyst containing a second heat resistant carrier having a BET specific surface area of 100 $m^2$/g or more and platinum supported by the second heat resistant carrier, palladium, and a first nitrogen oxide storage material, the second catalyst layer contains a mixture of a third supported catalyst and a second nitrogen oxide storage material, the third supported catalyst containing a third heat resistant carrier and platinum and palladium supported by the third heat resistant carrier, and the third supported catalyst having an alloying rate of platinum and palladium of 40% or more, and a mass of the second supported catalyst is greater than a mass of the first supported catalyst and greater than a mass of the third supported catalyst.

BRIEF DESCRIPTION OF THE DRAWING(S)

DETAILED DESCRIPTION

Hereinafter, aspects of the present invention will be described.

[Exhaust Gas-Purifying Catalyst]

Figure 1:
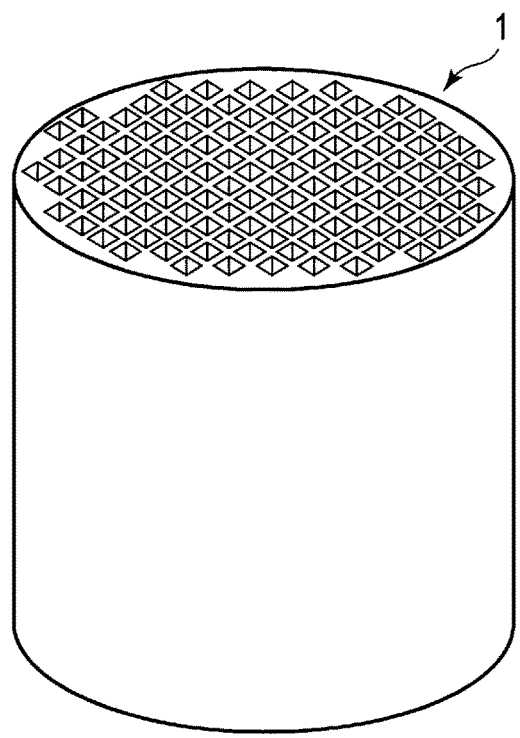
FIG. 1 is a perspective view schematically illustrating an exhaust gas-purifying catalyst according to an aspect of the present invention.
Figure 2:
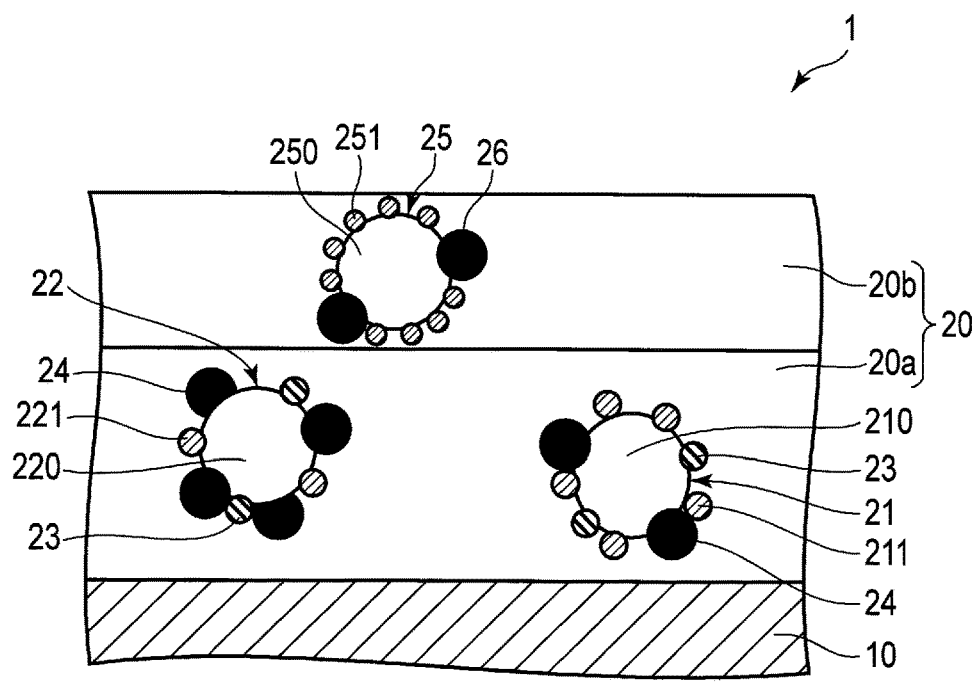
FIG. 2 is a cross-sectional view schematically illustrating an example of a structure which can be employed in the exhaust gas-purifying catalyst illustrated in FIG. 1.

FIG. 1 is a perspective view schematically illustrating an exhaust gas-purifying catalyst according to an aspect of the present invention. FIG. 2 is a cross-sectional view schematically illustrating an example of a structure which can be employed in the exhaust gas-purifying catalyst illustrated in FIG. 1.

An exhaust gas-purifying catalyst 1 illustrated in FIGS. 1 and 2 is a monolith catalyst. This exhaust gas-purifying catalyst 1 is typically an exhaust gas-purifying catalyst for a lean-burn engine. As illustrated in FIG. 2, this exhaust gas-purifying catalyst 1 includes a substrate 10 such as a monolith honeycomb substrate. The substrate 10 is typically formed of ceramics such as cordierite.

A catalyst layer 20 is formed on the partition walls of the substrate 10. The catalyst layer 20 includes a first catalyst layer 20a supported on the substrate 10 and a second catalyst layer 20b provided on the first catalyst layer 20a.

[First Catalyst Layer]

The first catalyst layer 20a contains a first supported catalyst 21, a second supported catalyst 22, palladium (Pd) 23, and a first nitrogen oxide ($NO_x$) storage material 24. The first catalyst layer 20a mainly plays a role of storing $NO_x$ in an oxidizing atmosphere and reducing $NO_x$ in a reducing atmosphere.

[First Supported Catalyst]

The first supported catalyst 21 contains a first heat resistant carrier 210 and a first noble metal 211. The first supported catalyst 21 mainly plays a role of reducing $NO_x$.

The proportion of the first supported catalyst 21 in the first catalyst layer 20a is, for example, 25% by mass or less, preferably in a range of 10% by mass to 20% by mass, and more preferably in a range of 12.5% by mass to 17.5% by mass.

The amount of the first supported catalyst 21 per unit volume of the exhaust gas-purifying catalyst 1 is, for example, in a range of 15 g/L to 40 g/L and preferably in a range of 25 g/L to 30 g/L.

The $NO_x$ storage amount in the exhaust gas-purifying catalyst 1 tends to decrease when the amount of the first supported catalyst 21 contained in the exhaust gas-purifying catalyst 1 is excessively increased. In addition, the $NO_x$ purification performance of the exhaust gas-purifying catalyst 1 tends to decrease when the amount of the first supported catalyst 21 contained in the exhaust gas-purifying catalyst 1 is excessively decreased.

[First Heat Resistant Carrier]

The first heat resistant carrier 210 is typically formed of an inorganic oxide including zirconia ($ZrO_2$), ceria ($CeO_2$), alumina ($Al_2O_3$), or a composite oxide of these. The first heat resistant carrier 210 preferably contains $ZrO_2$ and more preferably a composite oxide of $CeO_2$ with $ZrO_2$.

In a composite oxide of $ZrO_2$ with at least one of $CeO_2$ and $Al_2O_3$, the proportion of $ZrO_2$ is preferably 22% by mass or more and more preferably 70% by mass or more. This proportion is not particularly limited, but according to an example, the proportion is 93% by mass or less. The $NO_x$ purification performance of the first noble metal 211 tends to be enhanced when the proportion of $ZrO_2$ in the first heat resistant carrier 210 is increased.

In a composite oxide of $CeO_2$ with at least one of $ZrO_2$ and $Al_2O_3$, the proportion of $CeO_2$ is preferably in a range of 10% by mass to 40% by mass or less and more preferably in a range of 15% by mass to 25% by mass or less. The $NO_x$ purification performance of the first supported catalyst 21 tends to decrease when the proportion of $CeO_2$ in the first heat resistant carrier 210 is excessively increased or excessively decreased.

In the above composite oxide containing at least one of $ZrO_2$ and $CeO_2$, the proportion of $Al_2O_3$ is preferably 50% by mass or less. The $NO_x$ purification performance of the first supported catalyst 21 tends to decrease when the proportion of $Al_2O_3$ in the first heat resistant carrier 210 is excessively increased.

The first heat resistant carrier 210 is typically crystalline. The crystal structure of the first heat resistant carrier 210 can be confirmed by X-ray diffraction (XRD).

An average particle diameter of the first heat resistant carrier 210 is, for example, in a range of 5 μm to 30 μm and typically in a range of 5 μm to 15 μm. Incidentally, this "average particle diameter" means the value attained by the following method.

First, a part of the first catalyst layer 20a is removed from the exhaust gas-purifying catalyst 1. Next, a SEM image of this sample is taken at a magnification in a range of 1000-fold to 50000-fold using a scanning electron microscope (SEM). Subsequently, particles which are observed as a whole are selected from the first heat resistant carriers 210 taken in this SEM image, and the areas of the respective particles selected are determined. The diameters of circles having areas equal to these areas are respectively calculated, and the arithmetic mean of these diameters is attained. This arithmetic mean is adopted as the average particle diameter.

A BET specific surface area of the first heat resistant carrier 210 is preferably 80 $m^2$/g or more and more preferably 100 $m^2$/g or more. This specific surface area does not particularly have an upper limit value, but according to an example, the upper limit value is 130 $m^2$/g or less. When the specific surface area of the first heat resistant carrier 210 is large, the dispersibility of the first noble metal 211 supported on the first heat resistant carrier 210, palladium 23, and the first $NO_x$ storage material 24 tends to be high.

Incidentally, this "specific surface area" means a specific surface area determined by a nitrogen BET (Brunauer, Emmet and Teller) method, namely, a BET specific surface area. The specific surface area based on this nitrogen BET method can be determined by the following method.

First, the nitrogen gas adsorption amount (mL/mL) to the first heat resistant carrier 210 for each pressure P is measured while gradually raising the pressure P (mmHg) of nitrogen gas in nitrogen gas at 77 K (boiling point of nitrogen). Subsequently, the value attained by dividing the pressure P (mmHg) by the saturated vapor pressure $P_0$ (mmHg) of nitrogen gas is taken as the relative pressure $P/P_0$, and the nitrogen gas adsorption amount is plotted with respect to the respective relative pressures $P/P_0$ to attain an adsorption isotherm. Subsequently, a BET plot is calculated from this nitrogen adsorption isotherm and the BET equation, and this BET plot is utilized to attain a specific surface area. Incidentally, a BET multipoint method is used to calculate the BET plot.

[First Noble Metal]

The first noble metal 211 is selectively supported on the surface of the first heat resistant carrier 210. Here, to be "selectively supported" means that approximately all of the first noble metals 211 are supported on the first heat resistant carrier 210. However, this does not exclude the presence of the first noble metal 211 which is inevitably detached from the first heat resistant carrier 210.

The first noble metal 211 contains rhodium (Rh). The first noble metal 211 may contain a noble metal other than Rh but preferably contains only Rh. Rh and a noble metal other than Rh are less likely to form an alloy on the first heat resistant carrier 210 when the first heat resistant carrier 210 selectively supports only Rh. The catalytic performance of Rh and a noble metal other than Rh tends to decrease when Rh is alloyed with the noble metal other than Rh. For this reason, the purification performance of the first supported catalyst 21 is less likely to decrease when the first noble metal 211 contains only Rh.

The first noble metal 211 promotes the oxidation reaction of CO and HC and the reduction reaction of $NO_x$. Rh contained in the first noble metal 211 is excellent in promoting the $NO_x$ reduction reaction as compared with other noble metals such as Pt and Pd. Reaction Formula (1) is represented below in which $NO_x$ reacts with a reducing agent R and nitrogen ($N_2$) and a reducing agent oxide ($RO_x$) are generated.

$$NO_x + R \rightarrow 1/2 N_2 + RO_x \quad (1)$$

The first noble metal 211 is typically in the form of particles. An average particle diameter of the first noble metal 211 is smaller than the average particle diameter of the first heat resistant carrier 210. The average particle diameter of the first noble metal 211 is, for example, 40 nm or less and typically 20 nm or less. The lower limit value of the average particle diameter is not particularly limited, but according to an example, the lower limit value is 0.1 nm or more. When the average particle diameter of the first noble metal 211 is set to be small, the contact efficiency between the first noble metal 211 and the exhaust gas tends to increase and the purification performance tends to be enhanced. Incidentally, this "average particle diameter" means the value attained by a CO pulse adsorption method. As a CO pulse adsorption apparatus, a gas adsorption amount measuring apparatus manufactured by HEMMI Slide Rule Co., Ltd. and the like can be used.

The proportion of the first noble metal 211 in the first supported catalyst 21 is preferably in a range of 0.1% by mass to 5.0% by mass and more preferably in a range of 0.5% by mass to 1.5% by mass. The $NO_x$ purification performance of the first supported catalyst 21 tends to decrease when the proportion of the first noble metal 211 in the first supported catalyst 21 is excessively increased or excessively decreased.

The amount of the first noble metal 211 per unit volume of the exhaust gas-purifying catalyst 1 is preferably in a range of 0.05 g/L to 1.0 g/L and more preferably in a range of 0.25 g/L to 0.5 g/L.

[Second Supported Catalyst]

The second supported catalyst 22 contains a second heat resistant carrier 220 and a second noble metal 221. The second supported catalyst 22 mainly functions as a $NO_x$ storage material together with the first $NO_x$ storage material 24 supported on the second heat resistant carrier 220.

The proportion of the second supported catalyst 22 in all the supported catalysts contained in the exhaust gas-purifying catalyst 1 is the highest. In other words, the mass of the second supported catalyst 22 contained in the exhaust gas-purifying catalyst 1 is greater than the mass of the first supported catalyst 21 and greater than the mass of the third supported catalyst 25. In addition, the mass of the second supported catalyst 22 contained in the exhaust gas-purifying catalyst 1 is preferably greater than the total amount of the mass of the first supported catalyst 21 and the mass of the third supported catalyst 25.

The amount of the second supported catalyst 22 per unit volume of the exhaust gas-purifying catalyst 1 is, for example, 100 g/L or more, preferably 125 g/L or more, and more preferably 135 g/L or more. The upper limit value of the amount of the second supported catalyst 22 per unit volume of the exhaust gas-purifying catalyst 1 is not particularly limited, but according to an example, the upper limit value is 150 g/L. When the amount of the second supported catalyst 22 is increased, the proportion of the first $NO_x$ storage material 24 supported on the second supported catalyst 22 increases and the $NO_x$ storage amount in the exhaust gas-purifying catalyst 1 can be increased.

The ratio M1/M2 of the mass M1 of the second supported catalyst 22 to the mass M2 of the first supported catalyst 21 is, for example, 3.0 or more, preferably in a range of 4.5 to 5.5, and more preferably in a range of 4.75 to 5.25.

The ratio M1/M3 of the mass M1 of the second supported catalyst 22 to the mass M3 of the third supported catalyst 25 is preferably in a range of 1.0 to 2.5 and more preferably in a range of 1.8 to 2.3.

The proportion of the second supported catalyst 22 in the first catalyst layer 20a is preferably in a range of 70% by mass to 85% by mass and more preferably in a range of 73% by mass to 82% by mass.

[Second Heat Resistant Carrier]

It is preferable that a BET specific surface area of the second heat resistant carrier 220 is larger than the BET specific surface area of the first heat resistant carrier 210 and larger than a BET specific surface area of the third heat resistant carrier 250. The BET specific surface area of the second heat resistant carrier 220 is 100 m$^2$/g or more, preferably 120 m$^2$/g or more, and more preferably 130 m$^2$/g or more. When the BET specific surface area of the second heat resistant carrier 220 is large, the dispersibility of the second noble metal 221 supported on the second heat resistant carrier 220 and the first $NO_x$ storage material 24 is enhanced and the $NO_x$ storage ability of the second supported catalyst 22 tends to be enhanced in an oxidizing atmosphere.

The upper limit value of this BET specific surface area is not particularly limited, but the upper limit value is 150 m$^2$/g or less according to an example and typically 135 m$^2$/g or less. Incidentally, the BET specific surface area can be determined by the same method as the method of measuring the BET specific surface area of the first heat resistant carrier 210 described above.

The second heat resistant carrier 220 typically contains an inorganic oxide including $Al_2O_3$, $ZrO_2$, $CeO_2$, titania ($TiO_2$), magnesia ($MgO_2$), iron oxide ($Fe_2O_3$), barium carbonate ($BaCO_3$), or a composite oxide of these.

The second heat resistant carrier 220 is preferably an alumina-based composite oxide containing $Al_2O_3$ and at least one oxide selected from the group consisting of $ZrO_2$, $CeO_2$, $TiO_2$, $Fe_2O_3$, and $BaCO_3$. Specific examples of the alumina-based composite oxide include a composite oxide of $Al_2O_3$ with $ZrO_2$, a composite oxide of $Al_2O_3$ with $ZrO_2$ and $TiO_2$, and a composite oxide of $Al_2O_3$ with $MgO_2$.

The proportion of $Al_2O_3$ in this alumina-based composite oxide is preferably in a range of 40% by mass to 70% by mass and more preferably in a range of 50% by mass to 65% by mass. The heat resistance of the second supported catalyst 22 tends to be enhanced when the proportion of $Al_2O_3$ in the alumina-based composite oxide is increased.

When the proportion of oxides other than $Al_2O_3$ in the alumina-based composite oxide is increased, the stability of $NO_x$ stored in the first $NO_x$ storage material 24 supported on the second heat resistant carrier 220 tends to be enhanced and the $NO_x$ storage ability of the second supported catalyst 22 tends to be enhanced.

The proportion of $ZrO_2$ in the alumina-based composite oxide is preferably in a range of 0% by mass to 40% by mass and more preferably in a range of 25% by mass to 35% by mass.

In addition, the proportion of $MgO_2$ in the alumina-based composite oxide is preferably in a range of 10% by mass to 30% by mass and more preferably in a range of 15% by mass to 25% by mass.

In addition, the proportion of $TiO_2$ in the alumina-based composite oxide is preferably in a range of 5% by mass to 25% by mass and more preferably in a range of 10% by mass to 20% by mass.

In addition, the proportion of $Fe_2O_3$ in the alumina-based composite oxide is preferably in a range of 0% by mass to 5% by mass and more preferably in a range of 0% by mass to 3% by mass.

In addition, the proportion of $BaCO_3$ in the alumina-based composite oxide is preferably in a range of 0% by mass to 10% by mass and more preferably in a range of 0% by mass to 3% by mass.

The second heat resistant carrier 220 is typically crystalline. The crystal structure of the second heat resistant carrier 220 is preferably a spinel-type crystal structure. The second heat resistant carrier 220 having the spinel-type crystal structure tends to have a high BET specific surface area. Hence, the $NO_x$ storage amount in the exhaust gas-purifying catalyst 1 tends to increase when an oxide having the spinel-type crystal structure is used as the second heat resistant carrier 220. The crystal structure of the second heat resistant carrier 220 can be confirmed by X-ray diffraction (XRD).

The second heat resistant carrier 220 may be a mixture of different kinds of carriers. For example, the second heat resistant carrier 220 may be a mixture of the composite oxide of $Al_2O_3$ with $ZrO_2$ and the inorganic oxide having the spinel structure. In this case, the proportion of the inorganic oxide having the spinel structure in the mixture of plural kinds of second heat resistant carriers 220 is preferably 50% by mass or more.

Incidentally, in a case in which the second heat resistant carrier 220 is a mixture of plural kinds of carriers, the BET specific surface area of the second heat resistant carrier 220 described above may be attained as a weighted average of the BET specific surface areas of the carriers depending on the mass ratio of the carriers.

The average particle diameter of the second heat resistant carrier 220 is, for example, in a range of 5 μm to 30 μm and typically in a range of 5 μm to 15 μm. Incidentally, this average particle diameter can be determined by the same method as the method of measuring the average particle diameter of the first heat resistant carrier 210 described above.

[Second Noble Metal]

The second noble metal 221 is selectively supported on the surface of the second heat resistant carrier 220. The second noble metal 221 promotes the oxidation reaction of CO and HC and the reduction reaction of $NO_x$.

The second noble metal 221 contains Pt. The second noble metal 221 may contain a noble metal other than Pt but preferably contains only Pt. Pt and a noble metal other than Pt are less likely to form an alloy on the second heat resistant carrier 220 when the second heat resistant carrier 220 selectively supports only Pt. The catalytic performance of Pt and a noble metal other than Pt tends to decrease when Pt is alloyed with the noble metal other than Pt. For this reason, the purification performance of the second supported catalyst 22 is less likely to decrease when the second noble metal 221 contains only Pt.

Pt is excellent in promoting a reaction to oxidize nitric oxide (NO) and to generate $NO_2$ in an oxidizing atmosphere as compared with other noble metals such as Pd and Rh. $NO_2$ is more likely to be stored in the $NO_x$ storage material than NO. For this reason, the second heat resistant carrier 220 supporting Pt can further enhance the storage ability of the $NO_x$ storage material as compared with a carrier which does not support Pt.

The second noble metal 221 is typically in the form of particles. The average particle diameter of the second noble metal 221 is smaller than the average particle diameter of the second heat resistant carrier 220. The average particle diameter of the second noble metal 221 is 30 nm or less and more preferably 10 nm or less. The lower limit value of the average particle diameter is not particularly limited, but according to an example, the lower limit value is 0.1 nm or more. When the average particle diameter of the second noble metal 221 is set to be small, the contact efficiency between the second noble metal 221 and the exhaust gas tends to increase and the purification performance tends to be enhanced. Incidentally, this average particle diameter can be determined by the same measurement method as the method of measuring the average particle diameter of the first noble metal 211 described above.

The proportion of the second noble metal 221 in the second supported catalyst 22 is preferably in a range of 0.1% by mass to 1.0% by mass and more preferably in a range of 0.2% by mass to 0.5% by mass. The $NO_x$ purification performance of the second supported catalyst 22 tends to decrease when the proportion of the second noble metal 221 in the second supported catalyst 22 is excessively increased or excessively decreased.

The amount of the second noble metal 221 per unit volume of the exhaust gas-purifying catalyst 1 is, for example, in a range of 0.1 g/L to 1.0 g/L and preferably in a range of 0.2 g/L to 0.5 g/L.

[Palladium]

Pd contained in the first catalyst layer 20a is typically in the form of particles. These Pd particles 23 are typically supported on the first and second supported catalysts.

An average particle diameter of the Pd particles 23 is smaller than the average particle diameter of the first and second heat resistant carriers. The average particle diameter of the Pd particles 23 is preferably 10 nm or less and more preferably 3 nm or less. The lower limit value of the average particle diameter of the Pd particles 23 is not particularly limited, but according to an example, the lower limit value is 0.1 nm or more. When the average particle diameter of the Pd particles 23 is set to be small, the contact efficiency between the Pd particles 23 and the exhaust gas tends to increase and the $NO_x$ purification performance of the exhaust gas-purifying catalyst 1 tends to be enhanced. Incidentally, this average particle diameter can be determined by the same measurement method as the method of measuring the average particle diameter of the first noble metal 211 described above.

The Pd particles 23 promote the oxidation reaction of CO and HC and the reduction reaction of $NO_x$. The Pd particles 23 are superior to other noble metals such as Pt and Rh in promoting the oxidation reaction of CO and HC when the atmosphere changes from an oxidizing atmosphere to a reducing atmosphere. It is considered that this is because at least a part of the Pd particles 23 is in the form of palladium oxide (PdO) in an oxidizing atmosphere.

In other words, at least a part of PdO releases $O_2$ when the atmosphere changes from an oxidizing atmosphere to a reducing atmosphere. Pd reduced by the release of $O_2$ can then promote the oxidation reaction of CO and HC even in a reducing atmosphere using $O_2$ released from PdO itself and $O_2$ contained in the exhaust gas as an oxidizing agent. Hence, the $O_2$ concentration in the Pd-containing catalyst layer is maintained in a state of being lower than the $O_2$ concentration in the catalyst layer which does not contain Pd in a reducing atmosphere. For this reason, the catalyst layer containing Pd further promotes the reduction reaction as compared with the catalyst layer which does not contain Pd.

This exhaust gas-purifying catalyst 1 includes the first supported catalyst 21 and the Pd particles 23 in the first catalyst layer 20a. Moreover, the first supported catalyst 21 mainly plays a role of promoting the $NO_x$ reduction reaction as described above. Hence, when the first supported catalyst 21 and the Pd particles 23 are contained in the same catalyst layer, the $NO_x$ purification performance of the first supported catalyst 21 can be further enhanced by the effect of decreasing the concentration of $O_2$ in the catalyst layer by the Pd particles 23.

The ratio M4/M5 of the mass M4 of the Pd particles 23 contained in the first catalyst layer 20a to the mass M5 of the first noble metal 211 contained in the first supported catalyst 21 is preferably in a range of 0.15 to 0.9 and more preferably in a range of 0.18 to 0.50.

The proportion of the Pd particles 23 in the first catalyst layer 20a is, for example, 0.1% by mass or more, preferably in a range of 1% by mass to 5% by mass, and more preferably in a range of 2% by mass to 4% by mass. The $NO_x$ purification performance of the exhaust gas-purifying catalyst 1 tends to decrease when the proportion of the Pd particles 23 in the first catalyst layer 20a is excessively increased or excessively decreased.

The amount of the Pd particles 23 per unit volume of the exhaust gas-purifying catalyst 1 is, for example, in a range of 0.05 g/L to 0.5 g/L and preferably in a range of 0.1 g/L to 0.3 g/L.

[First $NO_x$ Storage Material]

The first $NO_x$ storage material 24 typically contains a carbonate or oxide containing at least one element selected from the group consisting of barium (Ba), potassium (K), lithium (Li), and cerium (Ce).

The crystal structure of an oxide containing Ce is preferably amorphous. In addition, the BET specific surface area of the oxide containing Ce is preferably 120 m²/g or more. This specific surface area does not particularly have an upper limit value, but according to an example, the upper limit value is 200 m²/g or less. Incidentally, the BET specific surface area can be determined by the same method as the method of measuring the BET specific surface area of the first heat resistant carrier 210 described above. In addition, the proportion of $CeO_2$ in the oxide containing Ce is typically 70% by mass or more.

The first $NO_x$ storage material 24 is typically supported on the first and second supported catalysts. The first $NO_x$ storage material 24 is typically in the form of particles. An average particle diameter of the first $NO_x$ storage material 24 is smaller than those of the first and second heat resistant carriers. The average particle diameter of the first $NO_x$ storage material 24 is preferably 5 nm or less and more preferably 1 nm or less. The lower limit value of the average particle diameter of the first $NO_x$ storage material 24 is not particularly limited, but according to an example, the lower limit value is 0.1 nm or more. When the average particle diameter of the first $NO_x$ storage material 24 is set to be small, the contact efficiency between the first $NO_x$ storage material 24 and the exhaust gas tends to increase and the $NO_x$ storage amount in the exhaust gas-purifying catalyst 1 tends to increase. Incidentally, the average particle diameter of the first $NO_x$ storage material 24 can be determined by the same method as the method of measuring the average particle diameter of the first heat resistant carrier 210 described above.

The first $NO_x$ storage material 24 stores $NO_x$ in an oxidizing atmosphere and releases $NO_x$ in a reducing atmosphere. The $NO_x$ storage and release mechanism of the first $NO_x$ storage material 24 will be described below in detail.

First, the first $NO_x$ storage material 24 reacts with CO in the exhaust gas in an oxidizing atmosphere to generate a carbonate. Thereafter, the carbonate of the first $NO_x$ storage material 24 reacts with $NO_2$ in the exhaust gas to generate a nitrate. In other words, $NO_x$ in the exhaust gas is stored in the first $NO_x$ storage material 24 in the form of a nitrate.

As an example of the $NO_x$ storage mechanism of the first $NO_x$ storage material 24, Reaction Formula (2) in which barium carbonate ($BaCO_3$) generates barium nitrate ($Ba(NO_3)_2$) by $NO_2$ and $O_2$ and Reaction Formula (3) in which potassium carbonate ($K_2CO_3$) generates potassium nitrate ($KNO_3$) by $NO_2$ and $O_2$ are presented below.

$$BaCO_3 + 2NO_2 + 1/2 O_2 \rightarrow Ba(NO_3)_2 + CO_2 \qquad (2)$$

$$K_2CO_3 + 2NO_2 + 1/2 O_2 \rightarrow 2KNO_3 + CO_2 \qquad (3)$$

Next, the nitrate of the first $NO_x$ storage material 24 reacts with the reducing agent R in a reducing atmosphere and $NO_x$ is thus released. As an example of the $NO_x$ release mechanism of the first $NO_x$ storage material 24, Reaction Formula (4) in which $Ba(NO_3)_2$ reacts with the reducing agent R and barium oxide (BaO) and a reducing agent oxide (RO) are thus generated and Reaction Formula (5) in which $KNO_3$ reacts with the reducing agent R and potassium oxide ($K_2O$) and RO are thus generated are presented below.

$$Ba(NO_3)_2 + 2R \rightarrow 2NO_x + BaO + 2RO_{2.5-x} \qquad (4)$$

$$KNO_3 + R \rightarrow NO_x + 1/2 K_2O + RO_{2.5-x} \qquad (5)$$

The first $NO_x$ storage material 24 which has released $NO_x$ is reduced from a nitrate to an oxide. By this, the $NO_x$ storage ability of the first $NO_x$ storage material 24 is regenerated and the first $NO_x$ storage material 24 can store $NO_x$ again.

The proportion of the first $NO_x$ storage material 24 in the first catalyst layer 20a is preferably in a range of 10% by mass to 40% by mass and more preferably in a range of 15% by mass to 25% by mass. The $NO_x$ purification performance of the exhaust gas-purifying catalyst 1 tends to decrease when the proportion of the first $NO_x$ storage material 24 in the first catalyst layer 20a is excessively increased. The $NO_x$ purification performance of the exhaust gas-purifying catalyst 1 tends to decrease when the proportion of the first $NO_x$ storage material 24 in the first catalyst layer 20a is excessively decreased.

The amount of the first $NO_x$ storage material 24 per unit volume of the exhaust gas-purifying catalyst 1 is preferably in a range of 30 g/L to 60 g/L and more preferably in a range of 40 g/L to 50 g/L.

[Second Catalyst Layer]

The second catalyst layer 20b contains a third supported catalyst 25 and a second $NO_x$ storage material 26. The second catalyst layer 20b mainly plays a role of oxidizing NO in an oxidizing atmosphere and thus generating $NO_2$.

[Third Supported Catalyst]

The third supported catalyst 25 contains a third heat resistant carrier 250 and a third noble metal 251. The third supported catalyst 25 mainly plays a role of oxidizing NO and thus generating $NO_2$.

The proportion of the third supported catalyst 25 in the second catalyst layer 20b is preferably in a range of 60% by mass to 90% by mass and more preferably in a range of 70% by mass to 80% by mass.

The amount of the third supported catalyst 25 per unit volume of the exhaust gas-purifying catalyst 1 is, for example, in a range of 50 g/L to 80 g/L and preferably in a range of 60 g/L to 70 g/L.

The $NO_x$ storage amount in the exhaust gas-purifying catalyst 1 tends to decrease when the amount of the third supported catalyst 25 contained in the exhaust gas-purifying catalyst 1 is excessively increased. In addition, the $NO_x$ purification performance of the exhaust gas-purifying catalyst 1 tends to decrease when the amount of the third supported catalyst 25 contained in the exhaust gas-purifying catalyst 1 is excessively decreased.

[Third Heat Resistant Carrier]

The third heat resistant carrier 250 is, for example, a porous oxide containing aluminum (Al), silicon (Si), or titanium (Ti) as a main component. The third heat resistant carrier 250 is typically an inorganic oxide including $Al_2O_3$, $SiO_2$, $TiO_2$, $ZrO_2$, $CeO_2$, $MgO_2$, $Fe_2O_3$, $BaCO_3$, $La_2O_3$ (lanthanum oxide), $Y_2O_3$ (yttrium oxide), or a composite oxide of these. The third heat resistant carrier 250 is preferably $Al_2O_3$ and may be an alumina-based composite oxide containing $Al_2O_3$ as a main component. As the alumina-based composite oxide, the same alumina-based composite oxides as those described as an example of the second heat resistant carrier can be used.

The third heat resistant carrier 250 is typically crystalline. The crystal structure of the third heat resistant carrier 250 is preferably the spinel-type crystal structure. The $NO_x$ storage amount in the exhaust gas-purifying catalyst 1 tends to increase when an oxide having the spinel-type crystal structure is used as the third heat resistant carrier 250. The crystal structure of the third heat resistant carrier 250 can be confirmed by X-ray diffraction (XRD).

The third heat resistant carrier 250 may be a mixture of different kinds of carriers. For example, the third heat resistant carrier 250 may be a mixture of $Al_2O_3$ with an alumina-based composite oxide having the spinel-type crystal structure. In this case, the proportion of the alumina-based composite oxide having a spinel-type crystal structure in the mixture of the plural kinds of third heat resistant carriers 250 is preferably 50% by mass or more. In a case in which at least one of the second heat resistant carrier 220 and the third heat resistant carrier 250 contains an inorganic oxide having the spinel-type crystal structure, the amount of the inorganic oxide having the spinel-type crystal structure per unit volume of the exhaust gas-purifying catalyst 1 is, for example, 30 g/L or more, preferably 50 g/L or more, and more preferably 65 g/L or more. The upper limit value of the amount of this inorganic oxide having the spinel-type crystal structure per unit volume is not particularly limited, but according to an example, the upper limit value is 150 g/L or less.

Incidentally, in a case in which the third heat resistant carrier 250 is a mixture of plural kinds of carriers, the BET specific surface area of the third heat resistant carrier 250 to be described later may be attained as a weighted average of the BET specific surface areas of these carriers depending on the mass ratio of the carriers.

The average particle diameter of the third heat resistant carrier 250 is, for example, in a range of 5 μm to 30 μm and typically in a range of 10 μm to 15 μm. Incidentally, this average particle diameter can be determined by the same method as the method of measuring the average particle diameter of the first heat resistant carrier 210 described above.

The BET specific surface area of the third heat resistant carrier 250 is preferably 50 m²/g or more and more preferably 120 m²/g or more. When the BET specific surface area of the third heat resistant carrier 250 is large, the dispersibility of the third noble metal 251 supported on the third supported catalyst 25 and the second $NO_x$ storage material 26 is enhanced and the $NO_x$ storage ability tends to be enhanced. The upper limit value of this BET specific surface area is not particularly limited, but the upper limit value is 200 m²/g or less according to an example and typically 150 m²/g or less. Incidentally, the BET specific surface area can be determined by the same method as the method of measuring the BET specific surface area of the first heat resistant carrier 210 described above.

[Third Noble Metal]

The third noble metal 251 is selectively supported on the surface of the third heat resistant carrier 250. The third noble metal 251 promotes the oxidation reaction of CO and HC and the reduction reaction of $NO_x$.

The third noble metal 251 is typically in the form of particles. The third noble metal 251 contains Pt and Pd. Pt mainly plays a role of promoting the oxidation reaction of CO, HC, and NO. Pd plays a role of suppressing sintering of Pt as well as promoting the oxidation reaction of CO, HC, and NO. The third noble metal 251 may contain noble metals other than Pt and Pd but preferably contains only Pt and Pd. When the third noble metal 251 contains Pt and Pd, Pt and Pd are less likely to be sintered and the dispersibility thereof tends to be high even after being used for a long period of time.

In addition, at least a part of Pt and at least a part of Pd contained in the third noble metal 251 form an alloy. Pt and Pd tend to be more hardly sintered when being alloyed.

The alloying rate of Pt and Pd contained in the third noble metal 251 can be determined by measurement using X-ray diffraction (XRD). The position of the diffraction peak of platinum attained by the measurement using X-ray diffraction shifts from the position of the diffraction peak attained for platinum as a simple metal when platinum is alloyed with palladium. In an alloy of platinum with palladium, a part of platinum atoms in the crystal lattice of platinum is substituted with palladium atoms. The palladium atom is smaller than the platinum atom, and thus spacing of the crystal lattice decreases when a part of platinum atoms is substituted with palladium atoms. The peak position of platinum shifts to a higher angle side by this decrease. Hence, the proportion of these alloys in the total amount of platinum and palladium can be estimated by examining the degree of change in this peak position.

Specifically, this alloying rate can be determined by the following equation.

First, the diffraction angle of the first diffracted light attained in a case in which platinum as a simple metal is subjected to X-ray diffraction measurement is denoted as $2\theta_1$. Next, the diffraction angle of the second diffracted light which is attained in a case in which a platinum-palladium alloy having the same atomic ratio as the atomic ratio between platinum and palladium contained in the first supported catalyst is subjected to X-ray diffraction measurement and corresponds to the first diffracted light is denoted as $2\theta_2$. Moreover, the diffraction angle of the third diffracted light which is attained in a case in which the first supported catalyst is subjected to X-ray diffraction measurement and corresponds to the first diffracted light is denoted as $2\theta_3$. The alloying rate is the ratio $(\theta_3-\theta_1)/(\theta_2-\theta_1)$.

Specifically, this alloying rate can be determined by the following procedure.

First, a first supported catalyst 31 is prepared as a sample SA3. This first supported catalyst 31 is subjected to a heat treatment for 10 hours in the air heated to 600° C. Subsequently, X-ray diffraction measurement is performed and the diffraction angle $2\theta_3$ for this sample SA3 is determined.

Next, a sample SA2 in which the alloying rate of platinum and palladium is 100% is prepared. Specifically, the sample SA3 is subjected to a heat treatment for 50 hours in the air heated to 900° C. Thereafter, X-ray diffraction measurement is performed and the diffraction angle $2\theta_2$ for this sample SA2 is determined.

Next, a sample SA1 in which only platinum is supported on the third heat resistant carrier 250 is prepared. Thereafter, X-ray diffraction measurement is performed and the diffraction angle $2\theta_1$ for the sample SA1 is determined.

The alloying rate of the sample SA3 is determined from the diffraction angles $2\theta_1$, $2\theta_2$, and $2\theta_3$ thus attained for the samples SA1 to SA3 and the above-described equation.

The alloying rate of Pt and Pd contained in the third noble metal 251 is 40% or more, preferably 45% or more, and more preferably 50% or more. Pt tends to be hardly sintered when this alloying rate is high. Incidentally, the upper limit value of this alloying rate is 60% according to an example.

The ratio M6/M7 of the mass M6 of Pt contained in the third supported catalyst 25 to the mass M7 of Pd contained in the third supported catalyst 25 is preferably in a range of 1 to 10. Sintering of Pt is further suppressed and the $NO_x$ purification performance of the exhaust gas-purifying catalyst 1 tends to be enhanced when this ratio M6/M7 is in this range. This ratio M6/M7 is more preferably in a range of 4 to 6.

The average particle diameter of the Pt—Pd alloyed particles of the third noble metal 251 is preferably smaller than the average particle diameter of the second noble metal 221. The average particle diameter of the Pt—Pd alloyed particles is preferably 15 nm or less and more preferably 10 nm or less. The lower limit value of the average particle diameter of the Pt—Pd alloyed particles is not particularly limited, but according to an example, the lower limit value is 1 nm or more. When the average particle diameter of the Pt—Pd alloyed particles is set to be small, the contact efficiency between the Pt—Pdalloyed particles and the exhaust gas tends to increase and the $NO_x$ purification performance of the exhaust gas-purifying catalyst 1 tends to be enhanced.

This average particle diameter can be determined utilizing X-ray diffraction measurement. In other words, the third supported catalyst 25 is subjected to X-ray diffraction measurement, a peak of Pt or Pd is selected from the diffraction spectrum attained by this, and an average particle diameter is calculated utilizing the Scherrer equation.

The ratio M8/M9 of the mass M8 of the third noble metal 251 to the mass M9 of the second noble metal 221 is preferably in a range of 3 to 6. When the ratio M8/M9 is in this range, $NO_2$ contained in the exhaust gas diffused from the second catalyst layer 20b to the first catalyst layer 20a is efficiently stored in the second supported catalyst 22 and thus the $NO_x$ purification performance of the exhaust gas-purifying catalyst 1 tends to be enhanced. This ratio M8/M9 is more preferably in a range of 4 to 5.

The proportion of the third noble metal 251 in the third supported catalyst 25 is preferably in a range of 0.5% by mass to 5.0% by mass and more preferably in a range of 2.0% by mass to 3.0% by mass. The $NO_x$ purification performance of the third supported catalyst 25 tends to decrease when the proportion of the third noble metal 251 in the third supported catalyst 25 is excessively increased or excessively decreased.

The amount of the third noble metal 251 per unit volume of the exhaust gas-purifying catalyst 1 is, for example, in a range of 0.2 g/L to 5.0 g/L and preferably in a range of 1.0 g/L to 3.0 g/L.

[Second $NO_x$ Storage Material]

As the second $NO_x$ storage material 26, the same one as the first $NO_x$ storage material 24 described above can be used. The mass of the second $NO_x$ storage material 26 and the mass of the first $NO_x$ storage material 24 may be the same as or different from each other.

The proportion of the second $NO_x$ storage material 26 in the second catalyst layer 20b is preferably in a range of 10% by mass to 30% by mass and more preferably in a range of 15% by mass to 25% by mass. The $NO_x$ purification performance of the exhaust gas-purifying catalyst 1 tends to decrease when the proportion of the second $NO_x$ storage material 26 in the second catalyst layer 20b is excessively increased. The $NO_x$ purification performance of the exhaust gas-purifying catalyst 1 tends to decrease when the proportion of the second $NO_x$ storage material 26 in the second catalyst layer 20b is excessively decreased.

The amount of the second $NO_x$ storage material 26 per unit volume of the exhaust gas-purifying catalyst 1 is, for example, in a range of 5 g/L to 30 g/L and preferably in a range of 12 g/L to 24 g/L.

[Other Components]

The first and second catalyst layers may further contain a binder in addition to the components described above.

The binder strengthens bonding between the constituents contained in the first and second catalyst layers and improves the durability of the catalyst. As the binder, for example, alumina sol, titania sol, silica sol, or any mixture of these can be used.

The proportion of the binder in the first catalyst layer 20a is preferably in a range of 1.0% by mass to 5.0% by mass and more preferably in a range of 3.0% by mass to 4.0% by mass.

The proportion of the binder in the second catalyst layer 20b is preferably in a range of 1.0% by mass to 5.0% by mass and more preferably in a range of 3.0% by mass to 4.0% by mass.

The amount of the binder per unit volume of the exhaust gas-purifying catalyst 1 is, for example, in a range of 2.0 g/L to 10 g/L and preferably in a range of 5.0 g/L to 15.0 g/L.

[Method of Producing Exhaust Gas-Purifying Catalyst]

Next, an example of a method of producing this exhaust gas-purifying catalyst 1 will be described.

[Method of Preparing First Supported Catalyst]

First, the first supported catalyst 21 is prepared. Specifically, a solution containing the first noble metal 211 and a powder of the first heat resistant carrier 210 are first mixed together and thoroughly stirred. Subsequently, this mixture is dried to obtain a powder. Subsequently, the powder obtained is fired in the air at a temperature of 450° C. to 550° C. for 1 to 3 hours. The first supported catalyst 21 is thus obtained.

[Method of Preparing Second Supported Catalyst]

Next, the second supported catalyst 22 is prepared. Specifically, a solution containing the second noble metal 221 and a powder of the second heat resistant carrier 220 are first mixed together and thoroughly stirred. Subsequently, this mixture is dried to obtain a powder. Subsequently, the powder obtained is fired in the air at a temperature of 450° C. to 550° C. for 1 to 3 hours. The second supported catalyst 22 is thus obtained.

[Method of Preparing Third Supported Catalyst]

Next, the third supported catalyst 25 is prepared.

Specifically, a dispersion containing composite particles of Pt and Pd is first prepared. The method of preparing this dispersion is as follows.

First, an acidic solution containing Pt and Pd is prepared. As a solvent of the acidic solution, it is preferable to use a hydrophilic solvent and it is more preferable to use water. The pH of this acidic solution is 1.0 to 4.0 according to an example and in a range of 1.0 to 6.0 according to another example.

It is preferable that at least one of Pt and Pd contained in the acidic solution is dissolved in the solvent. In a case in which the solvent is a hydrophilic solvent, it is preferable that at least one of Pt and Pd is in the state of an ion or a salt.

The ratio M10/M11 of the mass M10 of Pd contained in the acidic solution to the mass M11 of Pt contained in the acidic solution is not particularly limited, but the ratio is in a range of 0.01 to 1 according to an example, in a range of 0.03 to 0.5 according to another example, and in a range of 0.2 to 0.5 according to still another example.

As Pt and Pd sources, for example, salts of Pt and Pd can be used. The salts of Pt and Pd are not particularly limited as long as these can be dissolved in a hydrophilic solvent. The salts of Pt and Pd are, for example, acetates, carbonates, sulfates, nitrates, and nitrites of Pt and Pd or mixtures of these. As Pt and Pd sources, solutions in which these salts are dissolved in solvents may be used.

The Pt and Pd sources are added so that the total concentration of Pt and Pd in the dispersion is in a range of 4% by mass to 18% by mass according to an example, in a range of 7% by mass to 16% by mas according to another example, and in a range of 10% by mass to 15% by mass according to still another example.

Next, an organic base is gradually added to this acidic solution. By addition of an organic base, at least one of Pt and Pd in the acidic solution is precipitated by neutralization. By this, the Pt particles and the Pd particles form a composite in a state in which the respective particles are sufficiently close to each other. The composite is dispersed in the solution as fine particles by further adding the organic base to this solution. A dispersion containing composite particles of Pt and Pd is thus obtained. Incidentally, the reaction temperature at the time of formation of this composite is not particularly limited, but it is preferable to form this composite at normal temperature.

The average particle diameter of the particles contained in this dispersion is in a range of 0.8 nm to 10 nm according to an example, in a range of 1 nm to 7.5 nm according to another example, and in a range of 1.5 nm to 5 nm according to still another example.

The organic base functions as a dispersant as well as functions as a neutralizing agent. Hence, the average particle diameter of the particles contained in the dispersion can be appropriately adjusted by changing the kind of organic base.

In addition, the average particle diameter of the particles contained in the dispersion can also be adjusted by the kinds of Pt salt and Pd salt. In other words, the Pt salt and Pd salt form hydrates of hydroxides or oxides when neutralization proceeds by addition of the organic base to the acidic solution. This process of forming hydrates of hydroxides or oxides varies depending on the kinds of metal salts. For example, a chloride ion has a stronger coordinating power for a metal than a nitrate ion and is less likely to be eliminated. Hence, hydrates of hydroxides or oxides of Pt or Pd are less likely to be formed and to grow in a case in which a hydrochloride salt of Pt or Pd is used as a Pt or Pd source as compared with a case in which nitrates of these are used as a Pt or Pd source. For this reason, the average particle diameter of composite particles tends to be small when a hydrochloride of Pt or Pd is used as a Pt or Pd source.

This average particle diameter means a particle diameter at which the volume integrated value is 50% in the particle size distribution determined by dynamic light scattering (DLS). As a dynamic light scattering type particle size distribution measuring apparatus, Zetasizer (registered trademark) S manufactured by Malvern Panalytical Ltd. and the like can be used. As a sample when this particle size distribution measurement is performed, a diluted solution in which the dispersion is diluted with pure water so that the noble metal concentration is in a range of 0.1% by mass to 1% by mass is used. This average particle diameter is considered to mean the average particle diameter of composite particles. Incidentally, those in the form of ions are not detected by dynamic light scattering. Hence, this average particle diameter of composite particles does not include the ion diameter of the organic base.

The Raman spectrum of this dispersion attained by Raman spectroscopy has a peak in a range of 500 $cm^{-1}$ to 700 $cm^{-1}$. Here, "to have a peak in a range of 500 $cm^{-1}$ to 700 $cm^{-1}$" means that the top of the peak is located in the range of 500 $cm^{-1}$ to 700 $cm_{-1}$. The peak to be detected in this range is a peak derived from a hydroxide of Pt or Pd, or a hydrate of an oxide of Pt or Pd. In other words, at least one of Pt and Pd in this dispersion is considered to be in the form of a hydroxide or in the form of a hydrate of an oxide. Incidentally, as a sample when this Raman spectroscopic analysis is performed, a diluted solution in which the dispersion is diluted with pure water so that the noble metal concentration is 2% by mass is used.

This dispersion may be basic or acidic. The pH of this dispersion is in a range of 12 to 14 according to an example and in a range of 13 to 15 according to another example.

The kind of organic base is not particularly limited but is preferably an organic base having a low molecular weight. It is possible to produce a dispersion containing composite particles of Pt and Pd at a high concentration by using an organic base having a low molecular weight. The molecular weight of organic base is preferably 500 or less and more preferably 400 or less. The lower limit value of this molecular weight is 30 according to an example.

In addition, it is preferable that the organic base is hydrophilic. Specifically, it is preferable that 0.1 g or more of the organic base is soluble in 100 g of water at 25° C. Moreover, it is preferable that the number of carbon atoms constituting the main chain of the organic base is 20 or less. When a hydrophilic organic base is added to an acidic solution of which the solvent is a hydrophilic solvent to neutralize and precipitate composites of Pd and Pt, Pt and Pd can be formed into a composite in a state of being uniformly dispersed. Hence, when a hydrophilic organic base is used as the organic base as well as a hydrophilic solvent is used as a solvent of the acidic solution, composite particles in which Pt and Pd are relatively uniformly dispersed can be obtained.

Furthermore, it is preferable that the organic base does not contain any of a halogen or an aromatic ring in the structure. There is a possibility that the function of Pt and Pd composite particles is adversely affected when a halogen is contained in the structure of organic base. In addition, when an aromatic ring is contained in the structure of organic base, there is a possibility that undesirable substances such as a nitro compound is generated when the Pt and Pd composite particles are supported on the third heat resistant carrier 250 and fired.

Examples of the organic base include amino alcohol, cycloalkyl amine, cyclic amine, alkyl amine, tetraalkyl ammonium hydroxide, or any mixture of these. More specific examples of the organic base include tetramethylammonium hydroxide (TMAH), tetraethyl ammonium hydroxide (TEAH), tetrapropyl ammonium hydroxide (TPAH), tetrabutylammonium hydroxide (TBAH), monoethanolamine, N,N-dimethyl-2-aminoethanol, 3-amino-1-propanol, cyclohexylamine, diazabicycloundecene (DBU), diazabicyclononene (DBN), propylamine, methylamine, ethylamine, dimethylamine, triethylamine, or any mixture of these.

As the organic base, it is preferable to use TMAH, TEAH, TPAH, TBAH, monoethanolamine, N,N-dimethyl-2-aminoethanol, 3-amino-1-propanol, cyclohexylamine, DBU, DBN, propylamine, or any mixture of these. The boiling points of these organic bases are in a temperature range of 25° C. to 100° C. For this reason, these organic bases can be used without volatilizing at normal temperature.

As the organic base, it is more preferable to use TMAH, TEAH, TPAH, TBAH, monoethanolamine, N,N-dimethyl-2-aminoethanol, 3-amino-1-propanol, cyclohexylamine, or any mixture of these. The boiling point of these organic bases is 100° C. or higher. For this reason, these organic bases are less likely to volatilize even when being heated when the neutralized precipitates of Pt and Pd are dispersed. Hence, Pt and Pd composite particles can be more stably formed when these organic bases are used.

The amount of the organic base added is not particularly limited, but the organic base can be added so that the ratio N1/N2 of the number N1 of moles of the organic base to the total number N2 of moles of the plural kinds of metals contained in the acidic solution is in a rage of 0.1 to 10 according to an example, in a rage of 0.5 to 7 according to another example, and in a rage of 1 to 5 according to still another example.

The organic base is preferably mixed with the acidic solution so that the proportion of the organic base in the dispersion is 1% by mass or more from the viewpoint of more efficiently forming Pt and Pd particles into composite particles. The upper limit value of the organic base is not particularly limited, but the organic base can be mixed with the acidic solution so that, for example, the proportion of the organic base in the dispersion is 20% by mass, 10% by mass, or 5% by mass.

This dispersion typically does not contain a polymer dispersant. A polymer dispersant refers to a dispersant containing an organic polymer having a molecular weight of 750 or more. Examples of the polymer dispersant include polyethyleneimine and polyvinyl pyrrolidone (PVP).

When the third supported catalyst 25 is prepared using a dispersion containing a polymer dispersant, Pd and Pt tend to be easily detached from the third heat resistant carrier 250. In addition, when the third supported catalyst 25 is prepared using a dispersion containing a polymer dispersant, a carbon compound derived from an organic polymer may be generated in a great amount in the firing step to be described later. The generated carbon compound may adhere to the inside of the firing furnace and cause damage to the furnace body. This dispersion typically does not contain a polymeric dispersant and thus can avoid these problems.

Furthermore, this dispersion typically does not contain a reducing agent such as hydrogen, hydrazine, or sodium borohydride. In other words, a reduction treatment is not required when this dispersion is prepared. Hence, this dispersion can be prepared by a simple method as described above.

Next, the dispersion thus obtained and the third heat resistant carrier 250 are mixed together and thoroughly stirred. Subsequently, this mixture is dried to obtain a powder. Subsequently, the powder obtained is fired in the air at a temperature of 450° C. to 550° C. for 1 to 3 hours. The third supported catalyst 25 is thus obtained.

The Pt and Pd composite particles contained in this dispersion are not alloyed. At least a part of the Pt and Pd composite particles are alloyed in a step of being supported on the third heat resistant carrier 250 and fired, and the Pt and Pd alloyed particles are thus formed. Composite particles in which Pt and Pd are sufficiently close to each other are supported on the third heat resistant carrier 250 when this dispersion and the third heat resistant carrier 250 are mixed together. Hence, Pt and Pd in the composite particles can be alloyed on the third heat resistant carrier 250 at a relatively low temperature. For this reason, fine Pt and Pd alloyed particles can be uniformly dispersed on the third heat resistant carrier 250.

[Formation of First and Second Catalyst Layers]

Next, the first supported catalyst 21, the second supported catalyst 22, a palladium 23 source, a first $NO_x$ storage material 24 source, and water are mixed together and thoroughly stirred to obtain a first slurry.

As the palladium 23 source, the same one as the Pd source used in the method of producing the third supported catalyst 25 can be used.

As the first $NO_x$ storage material 24, an acetate, a nitrate, a sulfate, and a carbonate containing at least one element selected from the group consisting of Ba, K, Li, and Ce, or any mixture of these can be used.

Next, this first slurry is applied onto a honeycomb substrate 10 and heated at a temperature in a range of 90° C. to 250° C. for 5 minutes to 3 hours to dry the coated layer. Subsequently, the substrate 10 is fired at a temperature in a range of 450° C. to 550° C. for 1 to 3 hours. The first catalyst layer 20a is thus formed on the substrate 10.

Next, the third supported catalyst 25, a second $NO_x$ storage material 26 source, and water are mixed together and thoroughly stirred to obtain a second slurry. As the second $NO_x$ storage material 26 source, the same one as the first $NO_x$ storage material 24 source can be used.

Next, this second slurry is applied onto the honeycomb substrate 10 on which the first catalyst layer 20a is formed and heated at a temperature in a range of 90° C. to 250° C. for 5 minutes to 3 hours to dry the coated layer. Subsequently, the substrate 10 is fired at a temperature in a range of 450° C. to 550° C. for 1 to 3 hours. The second catalyst layer 20b is thus formed on the first catalyst layer 20a.

[$NO_x$ Purification Mechanism]

The exhaust gas-purifying catalyst 1 obtained as described above can achieve excellent $NO_x$ purification performance. It is considered that the reason is, for example, as described below. Here, it is described assuming that the combustion engine is a lean-burn engine.

First, a lean-burn engine is an engine in which an air-fuel mixture having an air-fuel ratio larger than the stoichiometric air-fuel ratio is supplied to the combustion chamber during normal driving. For this reason, the exhaust gas from the lean-burn engine during normal driving has relatively low concentrations of CO and HC and relatively high concentrations of $O_2$ and $NO_x$.

The catalyst layer contained in this exhaust gas-purifying catalyst 1 has a two-layer structure including the first catalyst layer 20a and the second catalyst layer 20b. Hence, the exhaust gas emitted from the lean-burn engine during normal driving first diffuses in the second catalyst layer 20b provided on the first catalyst layer 20a. At least a part of NO contained in the exhaust gas diffused in the second catalyst layer 20b is oxidized to $NO_2$ by the third noble metal 251 supported on the third supported catalyst 25. At least a part of $NO_2$ reacts with the second $NO_x$ storage material 26 supported on the third supported catalyst 25 to generate a nitrate.

In addition, at least parts of CO, HC, and $NO_x$ contained in the exhaust gas diffused in the second catalyst layer 20b are oxidized to $H_2O$ or $CO_2$ or reduced to $N_2$ by the third supported catalyst 25, and $H_2O$, $CO_2$, and $N_2$ are discharged from the second catalyst layer 20b into the air.

As described above, the Pt and Pd alloyed particles having an alloying rate of 40% or more are mainly supported on the third supported catalyst. Pt contained in the Pt and Pd alloyed particles can be maintained in a state of being relatively uniformly dispersed on the third heat resistant carrier 250 for a long period of time. Moreover, Pt is a catalyst excellent in promoting the oxidation reaction. Hence, the third supported catalyst 25 can efficiently oxidize NO in the exhaust gas to $NO_2$.

Next, the exhaust gas having passed through the second catalyst layer 20b diffuses in the first catalyst layer 20a. The concentration of NO contained in the exhaust gas having passed through the second catalyst layer 20b tends to be lower than the concentration of NO contained in the exhaust gas before passing through the second catalyst layer 20b, and the concentration of $NO_2$ contained in the exhaust gas having passed through the second catalyst layer 20b tends to be higher than the concentration of $NO_2$ contained in the exhaust gas before passing through the second catalyst layer 20b.

At least a part of NO diffused into the first catalyst layer 20a is oxidized to $NO_2$ by the noble metals supported on the first and second supported catalysts contained in the first catalyst layer 20a. This $NO_2$ generated on the first and second supported catalysts reacts with the second $NO_x$ storage material 24 supported on the first and second supported catalysts, respectively, to generate a nitrate. In addition, at least a part of $NO_2$ diffused from the second catalyst layer 20b to the first catalyst layer 20a reacts with the second $NO_x$ storage material 24 supported on the first and second supported catalysts to generate a nitrate.

In addition, at least parts of CO, HC, and $NO_x$ contained in the exhaust gas diffused in the first catalyst layer 20a are oxidized to $H_2O$ or $CO_2$ or reduced to $N_2$ by the noble metals supported on the first and second supported catalysts, and $H_2O$, $CO_2$, and $N_2$ are discharged from the first catalyst layer 20a into the air via the second catalyst layer $20_b$.

Here, the BET specific surface area of the second heat resistant carrier 220 of the second supported catalyst 22 is sufficiently large. Hence, Pt and the first $NO_x$ storage material 24 are supported on the surface of the second heat resistant carrier 220 in a state of exhibiting high dispersibility. In addition, Pt supported on the second supported catalyst 22 is superior to the Rh contained in the first supported catalyst 21 and the Pd particles 23 in promoting the NO oxidation reaction. Moreover, the mass of the second supported catalyst 22 is greater than the mass of the first supported catalyst 21 and greater than the mass of the third supported catalyst 25 in the exhaust gas-purifying catalyst 1. For this reason, the second supported catalyst 22 can store a large amount of $NO_x$ together with the first $NO_x$ storage material 24 supported on the second heat resistant carrier 220.

By employing such a configuration, the exhaust gas-purifying catalyst 1 can store a large amount of $NO_x$ when the exhaust gas in a reducing atmosphere is supplied. Hence, this exhaust gas-purifying catalyst 1 can continuously store $NO_x$ for a long period of time and can decrease the amount of $NO_x$ emitted from the combustion engine to the outside.

In the lean-burn engine system, rich spike treatment is performed to purify $NO_x$ stored in the exhaust gas-purifying catalyst 1. The rich spike treatment is a treatment to decrease the air-fuel ratio of an air-fuel mixture to be supplied to the combustion chamber of the lean-burn engine to a value less than the stoichiometric air-fuel ratio. Specific examples of the rich spike treatment include a treatment to decrease the air-fuel ratio of the air-fuel mixture in the combustion chamber by supplying excess fuel to the combustion chamber through the control of operating conditions or engine.

By this rich spike treatment, reducing exhaust gas is supplied from the lean-burn engine to the exhaust gas-purifying catalyst 1. This reducing exhaust gas has relatively high concentrations of CO and HC and relatively low concentrations of $O_2$ and $NO_x$.

This reducing exhaust gas first diffuses in the second catalyst layer 20b. At least parts of CO and HC contained in the exhaust gas act as a reducing agent on the third supported catalyst 25 to reduce a nitrate of the second $NO_x$ storage material 26. By this reduction reaction, the $NO_x$ storage ability of the second $NO_x$ storage material 26 is recovered as well as $NO_x$ is released from the second $NO_x$ storage material 26. At least a part of $NO_x$ released from the second $NO_x$ storage material 26 is reduced to N2 on the third noble metal 251 supported on the third supported catalyst 25 using CO and HC as a reducing agent.

In addition, at least parts of CO, HC, and $NO_x$ contained in the exhaust gas diffused in the second catalyst layer 20b are oxidized to $H_2O$ or $CO_2$ or reduced to $N_2$ by the third noble metal 251 supported on the third supported catalyst 25, and $H_2O$, $CO_2$, and $N_2$ are discharged from the second catalyst layer 20b into the air.

Next, the exhaust gas having passed through the second catalyst layer 20b diffuses into the first catalyst layer 20a. The exhaust gas diffused in the second catalyst layer 20b has lower concentrations of CO and HC and a higher concentration of $NO_x$ than the exhaust gas before diffusing in the second catalyst layer 20b.

Here, the first catalyst layer 20a contains the Pd particles 23. The Pd particles 23 exhibit high catalytic performance when the atmosphere changes from an oxidizing atmosphere to a reducing atmosphere and can promote the oxidation reaction of CO and HC using $O_2$ as an oxidizing agent even when the atmosphere changes. Hence, the $O_2$ concentration in the exhaust gas diffused in the first catalyst layer 20a is lower than the $O_2$ concentration in the exhaust gas diffused in the catalyst layer which does not contain Pd. For this reason, the reduction reaction tends to be more easily promoted when the first catalyst layer 20a contains Pd as compared with a case in which the first catalyst layer 20a does not contain Pd.

At least parts of CO and HC diffused in the first catalyst layer 20a act as a reducing agent on the noble metals supported on the first and second supported catalysts to reduce a nitrate of the first $NO_x$ storage material 24. By this reduction reaction, the $NO_x$ storage ability of the first $NO_x$ storage material 24 is recovered as well as $NO_x$ is released from the first $NO_x$ storage material 24. At least a part of NO released from the first $NO_x$ storage material 24 is reduced to $N_2$ on the noble metals supported on the first and second supported catalysts using CO and HC as a reducing agent.

In addition, at least parts of CO, HC, and $NO_x$ contained in the exhaust gas diffused in the first catalyst layer 20a are oxidized to $H_2O$ or $CO_2$ or reduced to $N_2$ by the noble metals supported on the first and second supported catalysts, and $H_2O$, $CO_2$, and $N_2$ are discharged from the first catalyst layer 20a into the air via the second catalyst layer 20b.

As described above, Rh supported on the first supported catalyst 21 exhibits high $NO_x$ purification performance. In addition, the first supported catalyst 21 and the second supported catalyst 22 are approximately uniformly mixed together in the first catalyst layer 20a. Hence, there is a high possibility that at least a part of the first supported catalyst 21 and at least a part of the second supported catalyst 22 are adjacent to each other. For this reason, the first supported catalyst 21 can reduce at least a part of a large amount of $NO_x$ released from the second supported catalyst 22 in addition to $NO_x$ released from the first supported catalyst 21 itself.

By employing such a configuration, the exhaust gas-purifying catalyst 1 can reduce a large amount of $NO_x$ to $N_2$ when the exhaust gas in a reducing atmosphere is supplied. Hence, this exhaust gas-purifying catalyst can realize high $NO_x$ purification performance even when the rich spike treatment time is short and the supply time of exhaust gas in a reducing atmosphere is short.

This exhaust gas-purifying catalyst 1 contains three kinds of supported catalysts of the first supported catalyst 21 mainly supporting Rh, the second supported catalyst 22 mainly supporting Pt, and the third supported catalyst 25 mainly supporting Pt and Pd alloyed particles. Moreover, the first and second supported catalysts are contained in the first catalyst layer 20a, and the third supported catalyst 25 is contained in the second catalyst layer 20b closer to the exhaust gas than the first catalyst layer 20a.

In this manner, the main role played by the first catalyst layer 20a can be made different from the main role played by the second catalyst layer 20b by setting the kinds of noble metals mainly supported on the three kinds of supported catalysts to be different from one another and disposing the first supported catalyst 21 and second supported catalyst 22 in different layer from the layer containing the third supported catalyst 25. Moreover, the purification performance of the exhaust gas-purifying catalyst 1 can be further enhanced by setting the main role played by the first catalyst layer 20a to storage and reduction of $NO_x$ and the main role played by the second catalyst layer 20b to oxidation of NO.

[Other Configurations]

The configuration of this exhaust gas-purifying catalyst 1 can be variously modified in addition to the configurations described above.

[First Modification]

Figure 3:
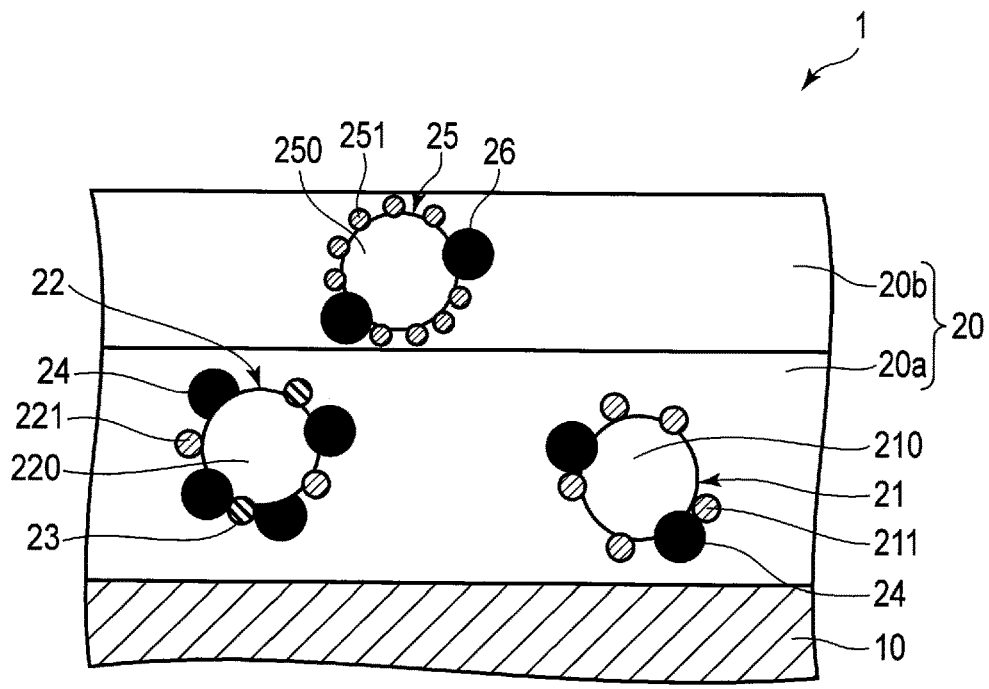
FIG. 3 is a cross-sectional view schematically illustrating a first modification of the exhaust gas-purifying catalyst illustrated in FIGS. 1 and 2.

FIG. 3 is a cross-sectional view schematically illustrating a first modification of the exhaust gas-purifying catalyst illustrated in FIGS. 1 and 2. This exhaust gas-purifying catalyst 1 is an exhaust gas-purifying catalyst 1 employing the same configuration as that of the exhaust gas-purifying catalyst 1 illustrated in FIGS. 1 and 2 except that the Pd particles 23 are selectively supported on the second supported catalyst 22 instead of being supported on the first and second supported catalysts in the first catalyst layer 20a.

Rh and Pd are less likely to form an alloy on the first heat resistant carrier 210 in the case of employing such a configuration. For this reason, the catalytic performance of Rh and Pd tends to hardly decrease. Hence, the purification performance of the exhaust gas-purifying catalyst 1 can be further enhanced in the case of employing such a configuration.

[Second Modification]

Figure 4:
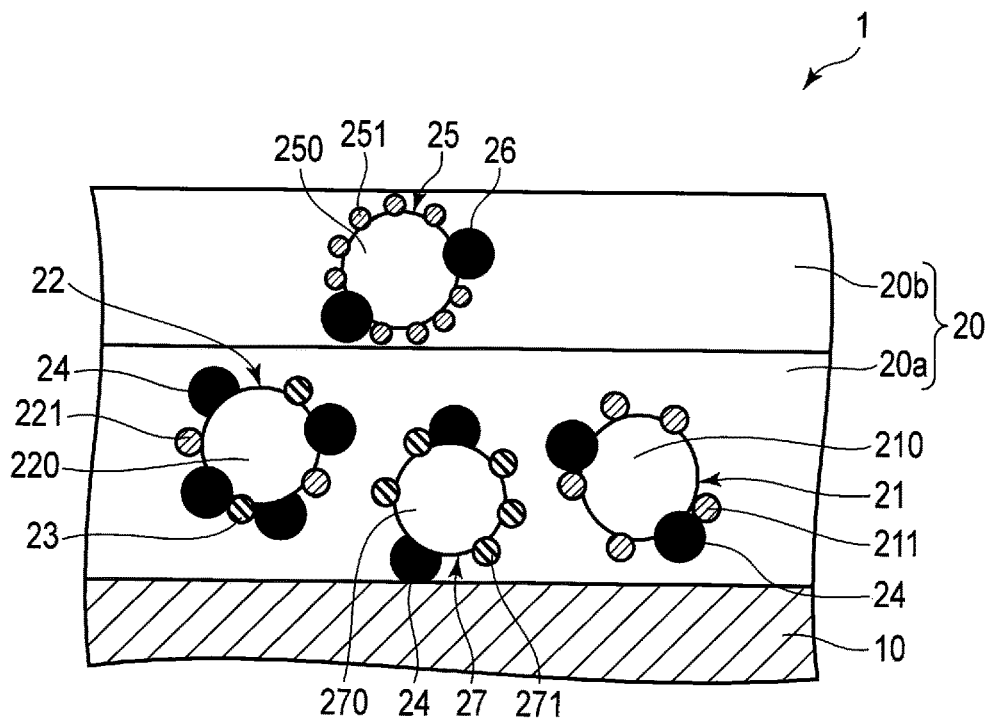
FIG. 4 is a cross-sectional view schematically illustrating a second modification of the exhaust gas-purifying catalyst illustrated in FIGS. 1 and 2.

FIG. 4 is a cross-sectional view schematically illustrating a second modification of the exhaust gas-purifying catalyst illustrated in FIGS. 1 and 2. This exhaust gas-purifying catalyst 1 is an exhaust gas-purifying catalyst employing the same configuration as that of the exhaust gas-purifying catalyst 1 illustrated in FIGS. 1 and 2 except that the Pd particles 23 are selectively supported on a fourth supported catalyst 27 instead of being supported on the first and second supported catalysts in the first catalyst layer 20a.

The fourth supported catalyst 27 is contained in the first catalyst layer 20a. The fourth supported catalyst 27 contains a fourth heat resistant carrier 270 and a fourth noble metal 271.

The proportion of the fourth supported catalyst 27 in the first catalyst layer 20a is, for example, 7.5% by mass or less, preferably in a range of 1.0% by mass to 5.0% by mass, and more preferably in a range of 2.0% by mass to 3.0% by mass.

The mass of the fourth supported catalyst 27 contained in the exhaust gas-purifying catalyst 1 is smaller than the mass of the second supported catalyst 22. In addition, the mass of the second supported catalyst 22 contained in the exhaust gas-purifying catalyst 1 is preferably greater than the total amount of the mass of the first supported catalyst 21, the mass of the third supported catalyst 25, and the mass of the fourth supported catalyst 27.

The amount of the fourth supported catalyst 27 per unit volume of the exhaust gas-purifying catalyst 1 is, for example, in a range of 3 g/L to 10 g/L and preferably in a range of 5 g/L to 7 g/L.

The $NO_x$ storage amount in the exhaust gas-purifying catalyst 1 tends to decrease when the amount of the fourth supported catalyst 27 contained in the exhaust gas-purifying catalyst 1 is excessively increased. In addition, the $NO_x$ purification performance of the exhaust gas-purifying catalyst 1 tends to decrease when the amount of the fourth supported catalyst 27 contained in the exhaust gas-purifying catalyst 1 is excessively decreased.

As the fourth heat resistant carrier 270, the same one as the third heat resistant carrier 250 can be used. In addition, the fourth heat resistant carrier 270 supports the first $NO_x$ storage material 24.

The fourth noble metal 271 is selectively supported on the fourth heat resistant carrier 270. The fourth noble metal 271 contains Pd. The fourth noble metal 271 may contain a noble metal other than Pd but preferably contains only Pd.

The proportion of the fourth noble metal 271 in the fourth supported catalyst 27 is preferably in a range of 1% by mass to 10% by mass and more preferably in a range of 2.5% by mass to 4.5% by mass. The $NO_x$ purification performance of the fourth supported catalyst 27 tends to decrease when the proportion of the fourth noble metal 271 in the fourth supported catalyst 27 is excessively increased or excessively decreased.

The amount of the fourth noble metal 271 per unit volume of the exhaust gas-purifying catalyst 1 is, for example, the same as the amount of Pd contained in the first catalyst layer 20a described above per unit volume of the exhaust gas-purifying catalyst 1.

In this second modification, Rh, Pt, and Pd contained in the first catalyst layer 20a are selectively supported on different carriers. Rh and Pd, and Pt and Pd are less likely to form an alloy in the case of employing such a configuration. For this reason, the catalytic performance of Rh, Pt, and Pd tends to more hardly decrease. Hence, the purification performance of the exhaust gas-purifying catalyst 1 can be further enhanced in the case of employing such a configuration.

Incidentally, this fourth supported catalyst 27 can be obtained by the same method as the method of producing the first supported catalyst 21 except that the kinds of noble metal and carrier are changed.

[Third Modification]

Figure 5:
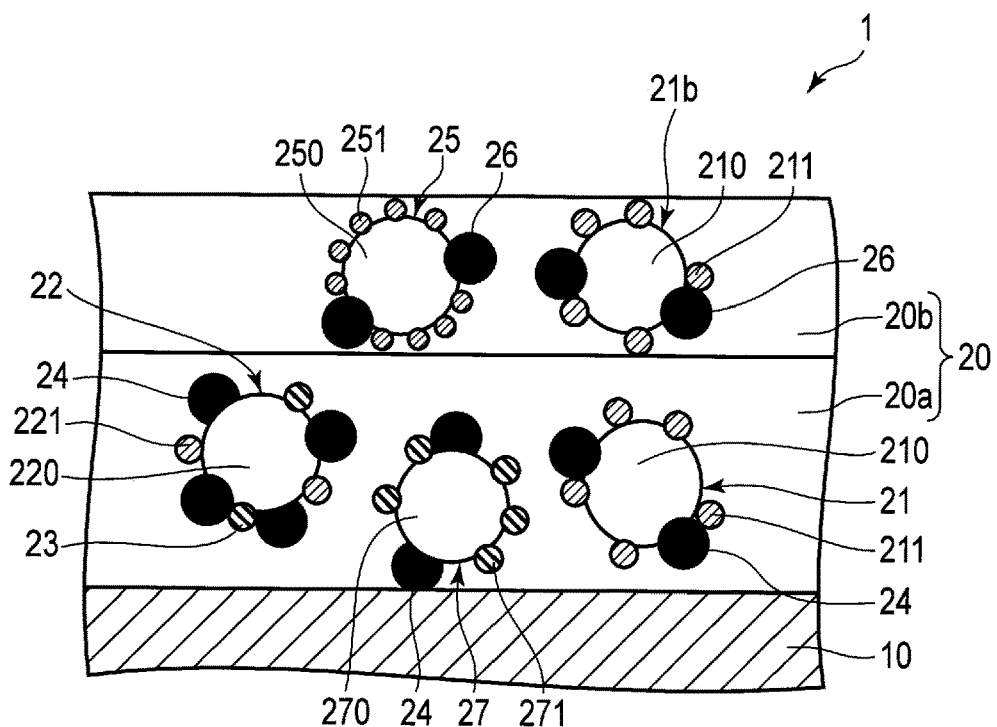
FIG. 5 is a cross-sectional view schematically illustrating a third modification of the exhaust gas-purifying catalyst illustrated in FIGS. 1 and 2.

FIG. 5 is a cross-sectional view schematically illustrating a third modification of the exhaust gas-purifying catalyst 1 illustrated in FIGS. 1 and 2. This exhaust gas-purifying catalyst 1 is an exhaust gas-purifying catalyst employing the same configuration as that of the second modification of the exhaust gas-purifying catalyst 1 illustrated in FIG. 4 except that the second catalyst layer 20b further contains the first supported catalyst 21b.

The first supported catalyst 21b is the same as the first supported catalyst 21. The proportion of the first supported catalyst 21b in the second catalyst layer 20b is preferably in a range of 3% by mass to 20% by mass and more preferably in a range of 5% by mass to 15% by mass.

The mass of the first supported catalyst 21b contained in the exhaust gas-purifying catalyst 1 is smaller than the mass of the second supported catalyst 22. In addition, the mass of the second supported catalyst 22 contained in the exhaust gas-purifying catalyst 1 is preferably greater than the total amount of the mass of the first supported catalyst 21, the mass of the first supported catalyst 21b, the mass of the third supported catalyst 25, and the mass of the fourth supported catalyst 27.

The amount of the first supported catalyst 21b per unit volume of the exhaust gas-purifying catalyst 1 is, for example, in a range of 3 g/L to 20 g/L and preferably in a range of 5 g/L to 12 g/L.

The mass of the first supported catalyst 21 contained in the first catalyst layer 20a and the mass of the first supported catalyst 21b contained in the second catalyst layer 20b may be the same as or different from each other.

The $NO_x$ reduction reaction can be promoted in the second catalyst layer 20b as well in the case of employing such a configuration. For this reason, the purification performance of the exhaust gas-purifying catalyst 1 can be further enhanced.

[Exhaust Gas-Purifying System]

The exhaust gas-purifying system includes an internal combustion engine which emits exhaust gas and an exhaust gas-purifying catalyst 1 installed in an exhaust gas emitting channel.

As the internal combustion engine, a lean-burn engine, a gasoline engine, or a diesel engine can be used.

This exhaust gas-purifying system may further include a three-way catalyst, a diesel oxidation catalyst (DOC), a diesel particulate filter (DPF), a selective catalytic reduction (SCR) system and the like in addition to the internal combustion engine and the exhaust gas-purifying catalyst 1.

A three-way catalyst and DOC promote the oxidation of CO and HC in an oxidizing atmosphere and the reduction reaction of $NO_x$ in a reducing atmosphere.

It is preferable that at least either of the three-way catalyst or DOC is installed between the internal combustion engine and the exhaust gas-purifying catalyst 1. In the case of employing such a configuration, at least a part of NO contained in the exhaust gas emitted from the internal combustion engine is first oxidized to $NO_2$ by at least one of the three-way catalyst and DOC. Hence, in the case of employing such a configuration, the concentration of $NO_2$ contained in the exhaust gas to be supplied to the exhaust gas-purifying catalyst 1 is higher as compared with a case in which at least one of the three-way catalyst and DOC is not contained. For this reason, the exhaust gas-purifying catalyst 1 is more likely to store $NO_2$ and the amount of $NO_2$ emitted to the outside can be decreased.

DPF adsorbs particulate substances contained in the exhaust gas emitted from the internal combustion engine. The DPF may be installed between at least one of the three-way catalyst and DOC and the exhaust gas-purifying catalyst 1 or downstream of the exhaust gas-purifying catalyst 1 along the flow of exhaust gas.

An SCR system purifies $NO_x$ using a reducing agent such as urea. The SCR system is preferably installed downstream of the exhaust gas-purifying catalyst 1 along the flow of exhaust gas. The amount of $NO_x$ emitted to the outside can be further decreased in the case of using such a configuration.

EXAMPLES

Hereinafter, Examples of the present invention will be described.

Example 1

[Preparation of First Supported Catalyst S1A]

A rhodium nitrate solution containing 0.3 g of Rh and 30 g of ceria-zirconia composite oxide CZ1 were mixed together and thoroughly stirred. Incidentally, the proportion of $CeO_2$ in ceria-zirconia composite oxide CZ1 was 30% by mass, and the proportion of $ZrO_2$ was 60% by mass. Subsequently, this mixture was dried to obtain a powder. Subsequently, the powder obtained was fired in the air at a temperature of 500° C. for 1 hour. A first supported catalyst S1A was thus obtained.

[Preparation of Second Supported Catalyst S2A]

A platinum nitrate solution containing 0.4 g of Pt and 100 g of alumina-zirconia composite oxide AZ1 were mixed together and thoroughly stirred. Incidentally, the BET specific surface area of alumina-zirconia composite oxide AZ1 was 120 m²/g. In addition, the proportion of $Al_2O_3$ in alumina-zirconia composite oxide AZ1 was 55% by mass and the proportion of $ZrO_2$ was 30% by mass. Subsequently, this mixture was dried to obtain a powder. Subsequently, the powder obtained was fired in the air at a temperature of 500° C. for 1 hour. A second supported catalyst S2A was thus obtained.

[Preparation of Dispersion D1]

An acidic solution was obtained by charging a platinum nitrate solution containing 5 g of Pt and a palladium nitrate solution containing 1 g of Pd into a beaker. Subsequently, this acidic solution was stirred for 5 minutes or more at a stirring speed of 200 rpm or more using a stirrer. The pH of this acidic solution was 3.5. Subsequently, TMAH (tetramethylammonium hydroxide) was added to this acidic solution at a rate of 2 ml/min using a tube pump until the pH reached 12, and the mixture was stirred for 30 minutes or more. Subsequently, this mixture was cooled to 25° C. and filtered through filter paper (No. 5C). Subsequently, pure water was added to the obtained filtrate to obtain a dispersion D1 of metal composite particles. The concentration of the noble metal contained in this dispersion D1 was 6% by mass.

The average particle diameter of the noble metal particles in the dispersion was measured using a sample adjusted so that the noble metal concentration in this dispersion D1 was 0.1% by mass by the method described above, and as a result, the average particle diameter was 2.0 nm.

In addition, this dispersion D1 was subjected to Raman spectroscopic analysis by the method described above, and as a result, a peak in a range of 500 cm$^{-1}$ to 700 cm$^{-1}$ was confirmed in the Raman spectrum attained.

[Preparation of Third Supported Catalyst S3A]

A dispersion D1 containing 1.5 g of Pt and 0.3 g of Pd and 50 g of alumina AO1 were mixed together and thoroughly stirred. Subsequently, this mixture was dried to obtain a powder. Subsequently, the powder obtained was fired in the air at a temperature of 500° C. for 1 hour. A third supported catalyst S3A was thus obtained.

This third supported catalyst S3A was subjected to XRD measurement, and the alloying rate of platinum and palladium was measured by the method described above. As a result, the alloying rate was 45%.

In addition, the average particle diameter of the Pt—Pd alloyed particles supported on the third supported catalyst S3A was measured by the method described above, and as a result, the average particle diameter of the Pt—Pd alloyed particles was 15 nm.

[Preparation of Fourth Supported Catalyst S4A]

A palladium nitrate solution containing 0.2 g of Pd and 10 g of alumina AO1 were mixed together and thoroughly stirred. Subsequently, this mixture was dried to obtain a powder. Subsequently, the powder obtained was fired in the air at a temperature of 500° C. for 1 hour. A fourth supported catalyst S4A was thus obtained.

[Production of Catalyst A]

A first slurry was obtained by mixing the entire amount of the first supported catalyst S1A, the entire amount of the second supported catalyst S2A, the entire amount of the fourth supported catalyst S4A, barium acetate, and 400 g of ion-exchanged water together. Subsequently, this first slurry was applied onto a monolith honeycomb carrier, dried at a temperature of 250° C. for 1 hour, and then fired at a temperature of 500° C. for 1 hour to obtain a first catalyst layer. Incidentally, the amount of the first slurry coated per unit volume of the first catalyst layer was 140 g/L, and the concentration of barium acetate in the first catalyst layer was 0.2 mol/L.

Next, a second slurry was obtained by mixing the entire amount of the third supported catalyst S3A, barium acetate, and 150 g of ion-exchanged water together. Subsequently, this second slurry was applied onto the monolith honeycomb carrier provided with the first catalyst layer, dried at a temperature of 250° C. for 1 hour, and then fired at a temperature of 500° C. for 1 hour to obtain a second catalyst layer. Incidentally, the amount of the second slurry coated per unit volume of the second catalyst layer was 50 g/L, and the concentration of barium acetate in the first catalyst layer was 0.2 mol/L.

An exhaust gas-purifying catalyst was thus obtained. Hereinafter, this exhaust gas-purifying catalyst is referred to as a catalyst A.

Example 2

[Preparation of Dispersion D2]

A dispersion D2 was obtained by the same method as that described in the example 1 except that TMAH (tetramethylammonium hydroxide) was added until the pH of the acidic solution reached 13.

The average particle diameter of the noble metal particles in the dispersion was measured using a sample adjusted so that the noble metal concentration in this dispersion D2 was 0.1% by mass by the method described above, and as a result, the average particle diameter was 16 nm.

In addition, this dispersion D2 was subjected to Raman spectroscopic analysis by the method described above, and as a result, a peak in a range of 500 cm$^{-1}$ to 700 cm$^{-1}$ was confirmed in the Raman spectrum attained.

[Preparation of Third Supported Catalyst S3B]

A third supported catalyst S3B was obtained by the same method as that described in the example 1 except that the dispersion D2 was used instead of the dispersion D1.

This third supported catalyst S3B was subjected to XRD measurement, and the alloying rate of platinum and palladium was measured by the method described above. As a result, the alloying rate was 50%.

In addition, the average particle diameter of the Pt—Pd alloyed particles supported on the third supported catalyst S3B was measured by the method described above, and as a result, the average particle diameter of the Pt—Pd alloyed particles was 15 nm.

[Production of Catalyst B]

An exhaust gas-purifying catalyst was obtained by the same method as that described in the example 1 except that the third supported catalyst S3B was used instead of the third supported catalyst S3A. Hereinafter, this exhaust gas-purifying catalyst is referred to as a catalyst B.

Example 3

[Preparation of Second Supported Catalyst S2C]

A second supported catalyst S2C was obtained by the same method as that described in the example 1 except that 50 g in 100 g of alumina-zirconia composite oxide AZ1 was replaced with alumina-zirconia-magnesium composite oxide AZM1.

Incidentally, the crystal structure of alumina-zirconia-magnesium composite oxide AZM1 was a spinel type. In addition, the BET specific surface area of this alumina-zirconia-magnesium composite oxide AZM1 was 180 m$^2$/g. In addition, the proportion of Al$_2$O$_3$ in this alumina-zirconia-magnesium composite oxide AZM1 was 65% by mass, the proportion of ZrO$_2$ was 15% by mass, and the proportion of MgO was 15% by mass.

[Production of Catalyst C]

An exhaust gas-purifying catalyst was obtained by the same method as that described in the example 1 except that the second supported catalyst S2C was used instead of the second supported catalyst S2A. Hereinafter, this exhaust gas-purifying catalyst is referred to as a catalyst C.

Example 4

[Preparation of Second Supported Catalyst S2D]

A second supported catalyst S2D was obtained by the same method as that described in the example 1 except that 100 g of alumina-zirconia-magnesium composite oxide AZM1 were used instead of 100 g of alumina-zirconia composite oxide AZ1.

[Production of Catalyst D]

An exhaust gas-purifying catalyst was obtained by the same method as that described in the example 1 except that the second supported catalyst S2D was used instead of the second supported catalyst S2A. Hereinafter, this exhaust gas-purifying catalyst is referred to as a catalyst E.

Example 5

[Production of Catalyst E]

An exhaust gas-purifying catalyst was obtained by the same method as that described in the example 1 except that the amount of the first supported catalyst S1A contained in the first slurry was decreased to two thirds from the entire amount and the rest of first supported catalyst S1A was added to the second slurry. Hereinafter, this exhaust gas-purifying catalyst is referred to as a catalyst E. Incidentally, the amount of the first slurry coated per unit volume of the first catalyst layer was 130 g/L and the amount of the second slurry coated per unit volume of the second catalyst layer was 60 g/L in the catalyst E.

Example 6

[Preparation of Third Supported Catalyst S3F]

A third supported catalyst S3F was obtained by the same method as that described in the example 1 except that 25 g in 50 g of alumina AO1 was replaced with 25 g of alumina-zirconia-magnesium composite oxide AZM1.

This third supported catalyst S3F was subjected to XRD measurement, and the alloying rate of platinum and palladium was measured by the method described above. As a result, the alloying rate was 45%.

In addition, the average particle diameter of the Pt—Pd alloyed particles supported on the third supported catalyst S3F was measured by the method described above, and as a result, the average particle diameter of the Pt—Pd alloyed particles was 15 nm.

[Production of Catalyst F]

An exhaust gas-purifying catalyst was obtained by the same method as that described in the example 1 except that the third supported catalyst S3F was used instead of the third supported catalyst S3A. Hereinafter, this exhaust gas-purifying catalyst is referred to as a catalyst F.

Example 7

[Preparation of Second Supported Catalyst S2G]

A platinum nitrate solution containing 0.4 g of Pt, a palladium nitrate solution containing 0.2 g of Pd, and 110 g of alumina-zirconia composite oxide AZ1 were mixed together and thoroughly stirred. Subsequently, this mixture was dried to obtain a powder. Subsequently, the powder obtained was fired in the air at a temperature of 500° C. for 1 hour. A second supported catalyst S2G was thus obtained.

[Production of Catalyst G]

An exhaust gas-purifying catalyst was obtained by the same method as that described in the example 1 except that the second supported catalyst S2G was used instead of the second supported catalyst S2A and the addition of the fourth supported catalyst S4A to the first slurry was omitted. Hereinafter, this exhaust gas-purifying catalyst is referred to as a catalyst G.

Example 8

[Preparation of Second Supported Catalyst S2H]

A second supported catalyst S2H was obtained by the same method as that described in the example 1 except that 100 g of alumina-zirconia-titania composite oxide AZT1 was used instead of 100 g of alumina-zirconia composite oxide AZ1.

Incidentally, the BET specific surface area of alumina-zirconia-titania composite oxide AZT1 was 100 m$^2$/g. In addition, the proportion of $Al_2O_3$ in this alumina-zirconia-titania composite oxide AZT1 was 50% by mass, the proportion of $ZrO_2$ was 35% by mass, and the proportion of $TiO_2$ was 10% by mass.

[Production of Catalyst H]

exhaust gas-purifying catalyst was obtained by the same method as that described in the example 1 except that the second supported catalyst S2H was used instead of the second supported catalyst S2A. Hereinafter, this exhaust gas-purifying catalyst is referred to as a catalyst H.

Example 9

[Preparation of Dispersion D3]

A dispersion D3 was obtained by the same method as that described in the example 1 except that TMAH (tetramethylammonium hydroxide) was added until the pH of the acidic solution reached 7.0.

The average particle diameter of the noble metal particles in the dispersion was measured using a sample adjusted so that the noble metal concentration in this dispersion D3 was 0.1% by mass by the method described above, and as a result, the average particle diameter was 15 nm.

In addition, this dispersion D3 was subjected to Raman spectroscopic analysis by the method described above, and as a result, a peak in a range of 500 cm$^{-1}$ to 700 cm$^{-1}$ was confirmed in the Raman spectrum attained.

[Preparation of Third Supported Catalyst S3I]

A third supported catalyst S3I was obtained by the same method as that described in the example 1 except that the dispersion D3 was used instead of the dispersion D1.

This third supported catalyst S3I was subjected to XRD measurement, and the alloying rate of platinum and palladium was measured by the method described above. As a result, the alloying rate was 30%.

In addition, the average particle diameter of the Pt—Pd alloyed particles supported on the third supported catalyst S3I was measured by the method described above, and as a result, the average particle diameter of the Pt—Pd alloyed particles was 30 nm.

[Production of Catalyst I]

An exhaust gas-purifying catalyst was obtained by the same method as that described in the example 1 except that the third supported catalyst S3I was used instead of the third supported catalyst S3A. Hereinafter, this exhaust gas-purifying catalyst is referred to as a catalyst I.

Example 10

[Preparation of Third Supported Catalyst S3J]

A third supported catalyst S3J was obtained by the same method as that described in the example 1 except that a platinum nitrate solution containing 1.5 g of Pt and a palladium nitrate solution containing 0.3 g of Pd were used instead of the dispersion D1.

Pt and Pd supported on this third supported catalyst S3J were subjected to XRD measurement, and it was not confirmed that Pt and Pd were alloyed. In addition, the average particle diameter of the Pt particles supported on the third supported catalyst S3J was measured by the method described above, and as a result, the average particle diameter thereof was 30 nm.

[Production of Catalyst J]

An exhaust gas-purifying catalyst was obtained by the same method as that described in the example 1 except that the third supported catalyst S3J was used instead of the third supported catalyst S3A. Hereinafter, this exhaust gas-purifying catalyst is referred to as a catalyst J.

Example 11

[Production of Catalyst K]

An exhaust gas-purifying catalyst was obtained by the same method as that described in the example 1 except that the addition of the fourth supported catalyst S4A to the first slurry was omitted. Hereinafter, this exhaust gas-purifying catalyst is referred to as a catalyst K.

Incidentally, the amount of the first slurry coated per unit volume of the first catalyst layer was 130 g/L in the catalyst K.

Example 12

[Preparation of Second Supported Catalyst S2L]

A second supported catalyst S2L was obtained by the same method as that described in the example 1 except that the amount of alumina-zirconia composite oxide AZ1 was changed from 100 g to 50 g.

[Preparation of Third Supported Catalyst S3L]

A third supported catalyst S3L was obtained by the same method as that described in the example 1 except that the amount of alumina AO1 was changed from 50 g to 100 g.

This third supported catalyst S3L was subjected to XRD measurement, and the alloying rate of platinum and palladium was measured by the method described above. As a result, the alloying rate was 45%.

In addition, the average particle diameter of the Pt—Pd alloyed particles supported on the third supported catalyst S3L was measured by the method described above, and as a result, the average particle diameter of the Pt—Pd alloyed particles was 15 nm.

[Production of Catalyst L]

An exhaust gas-purifying catalyst was obtained by the same method as that described in the example 1 except that the second supported catalyst S2L was used instead of the second supported catalyst S2A and the third supported catalyst S3L was used instead of the third supported catalyst S3A. Hereinafter, this exhaust gas-purifying catalyst is referred to as a catalyst L. Incidentally, the amount of the first slurry coated per unit volume of the first catalyst layer was 90 g/L and the amount of the second slurry coated per unit volume of the second catalyst layer was 100 g/L in the catalyst L.

Example 13

[Preparation of Third Supported Catalyst S3M1]

A platinum nitrate solution containing 1.5 g of Pt and 25 g of alumina AO1 were mixed together and thoroughly stirred. Subsequently, this mixture was dried to obtain a powder. Subsequently, the powder obtained was fired in the air at a temperature of 500° C. for 1 hour. A third supported catalyst S3M1 was thus obtained.

In addition, the average particle diameter of Pt supported on this third supported catalyst S3M1 was measured by a CO pulse adsorption method, and as a result, the average particle diameter of the Pt particles was 5 nm.

[Preparation of Third Supported Catalyst S3M2]

A palladium nitrate solution containing 0.3 g of Pd and 25 g of alumina AO1 were mixed together and thoroughly stirred. Subsequently, this mixture was dried to obtain a powder. Subsequently, the powder obtained was fired in the air at a temperature of 500° C. for 1 hour. A third supported catalyst S3M2 was thus obtained.

The average particle diameter of Pd supported on this third supported catalyst S3M2 was measured by a CO pulse adsorption method, and as a result, the average particle diameter of the Pd particles was 2 nm.

[Production of Catalyst M]

An exhaust gas-purifying catalyst was obtained by the same method as that described in the example 1 except that the third supported catalysts S3M1 and S3M2 were used instead of the third supported catalyst S3A. Hereinafter, this exhaust gas-purifying catalyst is referred to as a catalyst M.

Example 14

[Preparation of Second Supported Catalyst S2N]

A second supported catalyst S2N was obtained by the same method as that described in the example 1 except that 100 g of alumina-zirconia composite oxide AZ2 was used instead of 100 g of alumina-zirconia composite oxide AZ1.

Incidentally, the BET specific surface area of alumina-zirconia composite oxide AZ2 was 80 m$^2$/g. In addition, the proportion of $Al_2O_3$ in this alumina-zirconia composite oxide AZ2 was 50% by mass and the proportion of $ZrO_2$ was 45% by mass.

[Production of Catalyst N]

An exhaust gas-purifying catalyst was obtained by the same method as that described in the example 1 except that the second supported catalyst S2N was used instead of the second supported catalyst S2A. Hereinafter, this exhaust gas-purifying catalyst is referred to as a catalyst N.

Example 15

[Production of Catalyst O]

An exhaust gas-purifying catalyst was obtained by the same method as that described in the example 1 except that the addition of the first supported catalyst S1A to the first slurry was omitted but the entire amount of the first supported catalyst S1A was added to the second slurry. Hereinafter, this exhaust gas-purifying catalyst is referred to as a catalyst O. Incidentally, the amount of the first slurry coated per unit volume of the first catalyst layer was 110 g/L and the amount of the second slurry coated per unit volume of the second catalyst layer was 80 g/L in the catalyst O.

Example 16

[Production of Catalyst P]

An exhaust gas-purifying catalyst was obtained by the same method as that described in the example 1 except that the entire amount of the third supported catalyst S3A was added to the first slurry and the formation of the second catalyst layer was omitted. Hereinafter, this exhaust gas-purifying catalyst is referred to as a catalyst P. Incidentally, the amount of the first slurry coated per unit volume of the first catalyst layer was 190 g/L in the catalyst P.

<Evaluation on $NO_x$ Purification Rate by Exhaust Gas-Purifying Catalyst>

The $NO_x$ purification performance of the catalysts A to P was evaluated.

Specifically, first, each of the catalysts A to P was installed in an exhaust system of a motor vehicle equipped with a gasoline engine. Subsequently, the engine was driven for 50 hours in a state in which the temperature of the catalyst bed was maintained at a temperature of 730° C.

Subsequently, each catalyst was removed from the motor vehicle, and this catalyst was installed in an engine bench equipped with a gasoline engine of 2.0 L displacement. Subsequently, the engine was warmed up, then an air-fuel mixture having an air-fuel ratio of 13 was supplied to the combustion chamber, and reducing exhaust gas was emitted from the engine until approximately the entire $NO_x$ in the catalyst was discharged. Thereafter, an air-fuel mixture having an air-fuel ratio of 20 was supplied to the combustion chamber, and oxidizing exhaust gas was emitted from the engine until the total amount of $NO_x$ supplied to the catalyst reached 5 g. Subsequently, an air-fuel mixture having an air-fuel ratio of 13 was supplied to the combustion chamber, and reducing exhaust gas was emitted from the engine for 10 seconds.

Subsequently, the purification rate to be calculated by the following equation was determined as the $NO_x$ purification performance.

$NO_x$ purification rate (%)=($NO_x$ amount input−$NO_x$ amount output)/$NO_x$ amount input×100

Here, the "$NO_x$ amount input" means the total amount of $NO_x$ contained in the exhaust gas supplied to the catalyst. The "$NO_x$ amount output" means the total amount of $NO_x$ contained in the exhaust gas discharged from the catalyst.

This result is presented in Table 1.

layer is described in the row written as the "third supported catalyst" and "fourth supported catalyst", respectively.

In addition, in Table 1 above, the kind of inorganic oxide contained in the third heat resistant carrier is described in the row written as the "third heat resistant carrier" in the still lower row under the heading "third supported catalyst" among the lower rows under the heading "second catalyst layer". The alloying rate of Pt and Pd supported on the third supported catalyst is described in the row written as the "alloying rate (%)". Whether or not the first supported catalyst is contained in the second catalyst layer is described in the row written as the "first supported catalyst".

Furthermore, in Table 1 above, the $NO_x$ purification rate attained in the performance evaluation of exhaust gas-purifying catalyst described above is described in the row written as the "$NO_x$ purification rate (%)".

Figure 6:
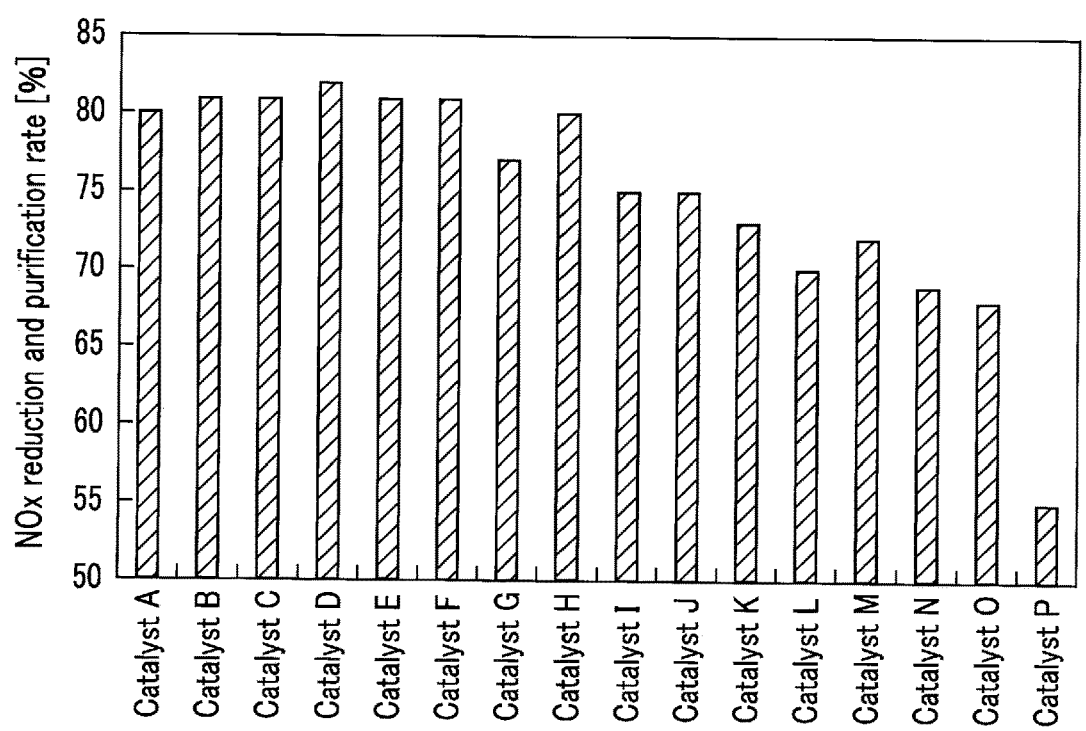
FIG. 6 is a graph illustrating an example of the $NO_x$ purification rate.

FIG. 6 is a graph illustrating an example of the $NO_x$ purification rate. FIG. 6 has been created using the data attained in Examples 1 to 16. As apparent from FIG. 6 and Table 1, among all the supported catalysts which include a

TABLE 1

| | First catalyst layer | | | | | | Second catalyst layer | | | |
|---|---|---|---|---|---|---|---|---|---|---|
| | | Second supported catalyst | | | | | Third supported catalyst | | | $NO_x$ |
| | First supported catalyst | Second heat resistant carrier | Content (g/L) | Specific surface area ($m^2$/g) | Noble metal | Third supported catalyst | Fourth supported catalyst | Third heat resistant carrier | Alloying rate (%) | First supported catalyst | purification rate (%) |
| Example 1 | Presence | $Al_2O_3 \cdot ZrO_2$ | 100 | 120 | Pt | Absence | Presence | $Al_2O_3$ | 45 | Absence | 80 |
| Example 2 | Presence | $Al_2O_3 \cdot ZrO_2$ | 100 | 120 | Pt | Absence | Presence | $Al_2O_3$ | 50 | Absence | 81 |
| Example 3 | Presence | $Al_2O_3 \cdot ZrO_2$ Spinel-type oxide | 50 50 | 150 | Pt | Absence | Presence | $Al_2O_3$ | 45 | Absence | 81 |
| Example 4 | Presence | Spinel-type oxide | 100 | 180 | Pt | Absence | Presence | $Al_2O_3$ | 45 | Absence | 82 |
| Example 5 | Presence | $Al_2O_3 \cdot ZrO_2$ | 100 | 120 | Pt | Absence | Presence | $Al_2O_3$ | 45 | Presence | 81 |
| Example 6 | Presence | $Al_2O_3 \cdot ZrO_2$ | 110 | 120 | Pt | Absence | Presence | $Al_2O_3$ Spinel-type oxide | 45 | Absence | 81 |
| Example 7 | Presence | $Al_2O_3 \cdot ZrO_2$ | 100 | 120 | Pt, Pd | Absence | Absence | $Al_2O_3$ | 45 | Absence | 77 |
| Example 8 | Presence | $Al_2O_3 \cdot ZrO_2 \cdot TiO_2$ | 100 | 100 | Pt | Absence | Presence | $Al_2O_3$ | 45 | Absence | 80 |
| Example 9 | Presence | $Al_2O_3 \cdot ZrO_2$ | 100 | 120 | Pt | Absence | Presence | $Al_2O_3$ | 30 | Absence | 75 |
| Example 10 | Presence | $Al_2O_3 \cdot ZrO_2$ | 100 | 120 | Pt | Absence | Presence | $Al_2O_3$ | — | Absence | 75 |
| Example 11 | Presence | $Al_2O_3 \cdot ZrO_2$ | 100 | 120 | Pt | Absence | Absence | $Al_2O_3$ | 45 | Absence | 73 |
| Example 12 | Presence | $Al_2O_3 \cdot ZrO_2$ | 50 | 120 | Pt | Absence | Presence | $Al_2O_3$ | 45 | Absence | 70 |
| Example 13 | Presence | $Al_2O_3 \cdot ZrO_2$ | 100 | 120 | Pt | Absence | Presence | $Al_2O_3$ | Individually supported | Absence | 72 |
| Example 14 | Presence | $Al_2O_3 \cdot ZrO_2$ | 100 | 80 | Pt | Absence | Presence | $Al_2O_3$ | 45 | Absence | 69 |
| Example 15 | Absence | $Al_2O_3 \cdot ZrO_2$ | 100 | 120 | Pt | Absence | Presence | $Al_2O_3$ | 45 | Presence | 68 |
| Example 16 | Presence | $Al_2O_3 \cdot ZrO_2$ | 100 | 120 | Pt | Presence | Presence | — | — | Absence | 55 |

In Table 1, whether or not the first supported catalyst is contained in the first catalyst layer is described in the row written as the "first supported catalyst" among the lower rows under the heading "first catalyst layer". The kind of inorganic oxide contained in the second heat resistant carrier is described in the row written as the "second heat resistant carrier" among the lower rows under the heading "second supported catalyst". The amount of the second supported catalyst contained in the first catalyst layer per unit volume is described in the row written as the "content (g/L)". The specific surface area of the second heat resistant carrier is described in the row written as the "specific surface area ($m^2$/g)". The kind of noble metal supported on the second supported catalyst is described in the row written as the "noble metal". In addition, whether or not the third and fourth supported catalysts are contained in the first catalyst catalyst layer having a two-layer structure and are contained in the exhaust gas-purifying catalyst 1 and in which the first catalyst layer contains palladium, and the specific surface area of the second heat resistant carrier is larger than 100 $m^2$/g, and the alloying rate of Pt and Pd supported on the third supported catalyst is 40% or more, the catalysts A to H having the highest proportion of the second supported catalyst exhibited a higher $NO_x$ purification rate as compared with the catalysts I to P which do not satisfy at least one of these requirements.

Figure 7:
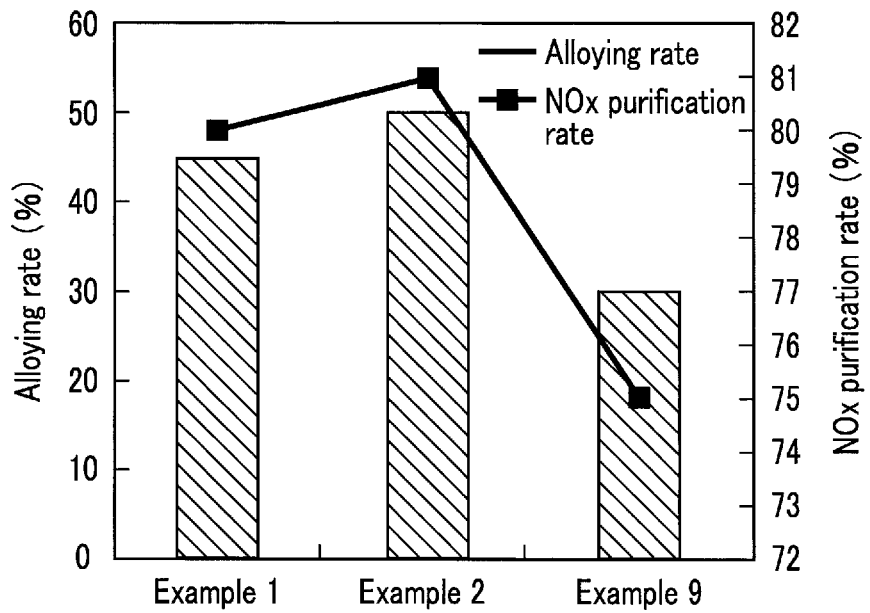
FIG. 7 is a graph illustrating an example of the relation between the alloying rate of Pt and Pd and the $NO_x$ purification rate.

FIG. 7 is a graph illustrating an example of the relation between the alloying rate and the $NO_x$ purification rate. FIG. 7 has been created using the data attained in the example 1, example 2, and example 9. In the graph illustrated in FIG. 7, the vertical axis at the left end of the graph represents the alloying rate of Pt and Pd supported on the third supported catalyst and the vertical axis at the right end of the graph represents the $NO_x$ purification rate attained for the exhaust gas-purifying catalyst.

As illustrated in FIG. 7, the catalysts having an alloying rate of Pt and Pd supported on the third supported catalyst of 40% or more tend to have a higher $NO_x$ purification rate as compared with the catalysts having an alloying rate of Pt and Pd supported on the third supported catalyst of less than 40%.

Figure 8:
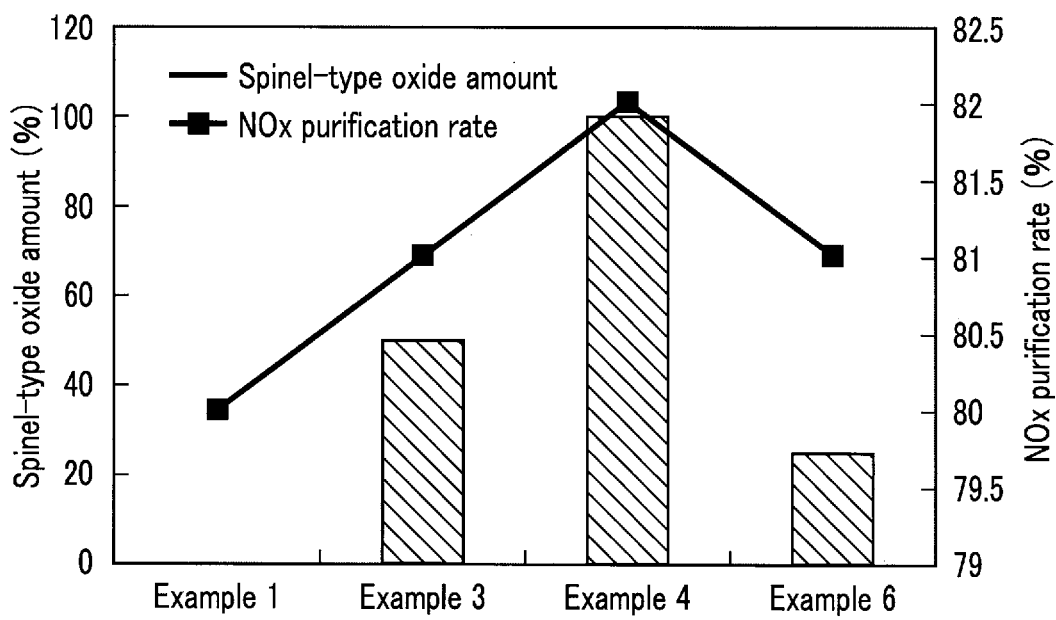
FIG. 8 is a graph illustrating an example of the relation between the amount of spinel oxide per unit volume and the $NO_x$ purification rate.

FIG. 8 is a graph illustrating an example of the relation between the amount of spinel oxide per unit volume and the $NO_x$ purification rate. FIG. 8 has been created using the data attained in the example 1, example 3, example 4, and example 6. In the graph illustrated in FIG. 8, the vertical axis at the left end of the graph represents the amount of oxide which has a spinel-type crystal structure and is contained in the second heat resistant carrier and third heat resistant carrier per unit volume and the vertical axis at the right end of the graph represents the $NO_x$ purification rate attained for the exhaust gas-purifying catalyst.

As illustrated in FIG. 8, the $NO_x$ purification rate of exhaust gas-purifying catalyst tends to be high when at least one of the second heat resistant carrier and the third heat resistant carrier contains an oxide having a spinel-type crystal structure.

Figure 9:
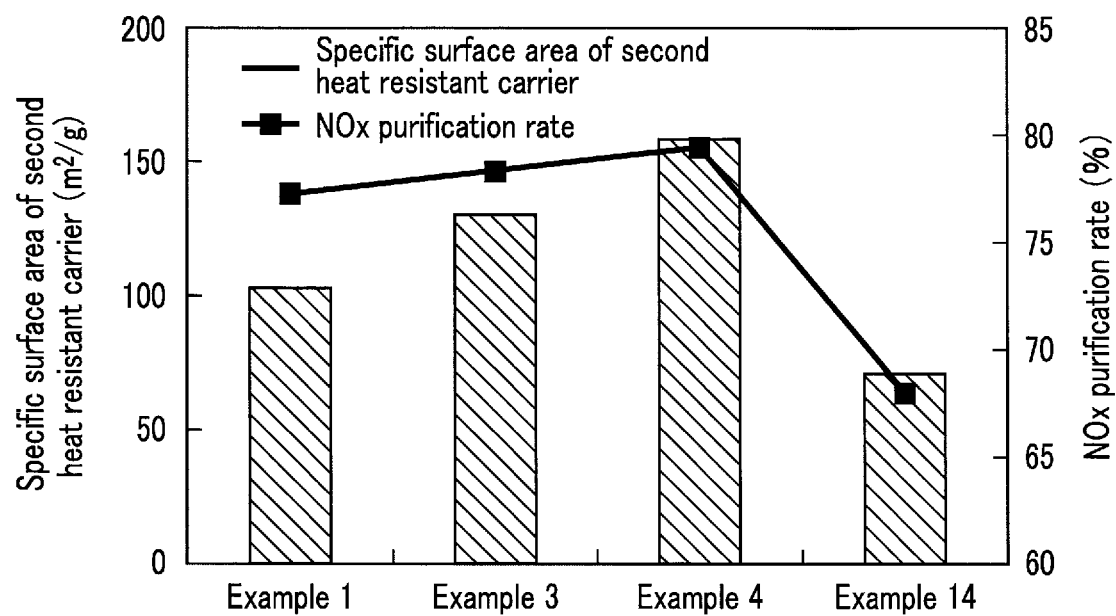
FIG. 9 is a graph illustrating an example of the relation between the specific surface area of the second heat resistant carrier and the $NO_x$ purification rate.

FIG. 9 is a graph illustrating an example of the relation between the specific surface area of the second heat resistant carrier and the $NO_x$ purification rate. FIG. 9 has been created using the data attained in the example 1, example 3, example 4, and example 14. In the graph illustrated in FIG. 9, the vertical axis at the left end of the graph represents the BET specific surface area of the second heat resistant carrier and the vertical axis at the right end of the graph represents the $NO_x$ purification rate attained for the exhaust gas-purifying catalyst.

As illustrated in FIG. 9, the $NO_x$ purification rate of exhaust gas-purifying catalyst tends to be high when the specific surface area of the second heat resistant carrier is large.

What is claimed is:

1. An exhaust gas-purifying catalyst comprising:
    a substrate;
    a first catalyst layer supported by the substrate; and
    a second catalyst layer provided on the first catalyst layer, wherein
    the first catalyst layer contains a mixture of a first supported catalyst containing a first heat resistant carrier and rhodium supported by the first heat resistant carrier, a second supported catalyst containing a second heat resistant carrier having a BET specific surface area of 100 m²/g or more and platinum supported by the second heat resistant carrier, palladium, and a first nitrogen oxide storage material,
    the second catalyst layer contains a mixture of a third supported catalyst and a second nitrogen oxide storage material, the third supported catalyst containing a third heat resistant carrier and platinum and palladium supported by the third heat resistant carrier, and the third supported catalyst having an alloying rate of platinum and palladium of 40% or more, and
    a mass of the second supported catalyst is greater than a mass of the first supported catalyst and greater than a mass of the third supported catalyst, and
    at least one of the second heat resistant carrier and the third heat resistant carrier contains an inorganic oxide having a spinel-type crystal structure.

2. The exhaust gas-purifying catalyst according to claim 1, wherein palladium contained in the first catalyst layer is supported by the second heat resistant carrier.

3. The exhaust gas-purifying catalyst according to claim 2, wherein the second catalyst layer further contains the first supported catalyst.

4. The exhaust gas-purifying catalyst according to claim 2, wherein the first and second nitrogen oxide storage materials contain a carbonate or oxide containing at least one element selected from the group consisting of barium, potassium, lithium, and cerium.

5. The exhaust gas-purifying catalyst according to claim 1, wherein palladium contained in the first catalyst layer is supported by a fourth heat resistant carrier.

6. The exhaust gas-purifying catalyst according to claim 5, wherein the second catalyst layer further contains the first supported catalyst.

7. The exhaust gas-purifying catalyst according to claim 5, wherein the first and second nitrogen oxide storage materials contain a carbonate or oxide containing at least one element selected from the group consisting of barium, potassium, lithium, and cerium.

8. The exhaust gas-purifying catalyst according to claim 1, wherein an amount of the inorganic oxide having a spinel-type crystal structure per unit volume is 30 g/L or more.

9. The exhaust gas-purifying catalyst according to claim 1, wherein the second catalyst layer further contains the first supported catalyst.

10. The exhaust gas-purifying catalyst according to claim 1, wherein the first and second nitrogen oxide storage materials contain a carbonate or oxide containing at least one element selected from the group consisting of barium, potassium, lithium, and cerium.

* * * * *